United States Patent [19]

Klassen et al.

[11] Patent Number: 5,553,881
[45] Date of Patent: Sep. 10, 1996

[54] BICYCLE REAR SUSPENSION SYSTEM

[75] Inventors: James B. Klassen; Jamie W. Calon, both of Calgary, Canada

[73] Assignee: Outland Design Technologies, Inc., Lynden, Wash.

[21] Appl. No.: 377,931

[22] Filed: Jan. 25, 1995

[51] Int. Cl.$^6$ ............................................. B62K 25/00
[52] U.S. Cl. ................................. 280/284; 280/283
[58] Field of Search ............................ 280/284, 283, 280/281.1, 285, 275

[56] References Cited

U.S. PATENT DOCUMENTS

| | | | |
|---|---|---|---|
| 4,671,525 | 6/1987 | Ribi | 280/284 |
| 4,789,042 | 12/1988 | Pitts | 280/284 X |
| 4,789,174 | 12/1988 | Lawwill | 280/284 |
| 5,121,937 | 6/1992 | Lawwill | 280/284 |
| 5,306,036 | 4/1994 | Busby | 280/284 |
| 5,452,910 | 9/1995 | Harris | 280/283 X |

FOREIGN PATENT DOCUMENTS

| | | | |
|---|---|---|---|
| 933079 | 4/1948 | France | 280/284 |
| 692011 | 5/1940 | Germany | 280/284 |

Primary Examiner—Eric D. Culbreth
Assistant Examiner—Victor E. Johnson
Attorney, Agent, or Firm—Todd N. Hathaway

[57] ABSTRACT

A rear suspension system for a bicycle. The system directs the rear wheel along a predetermined, S-shaped path as the suspension is compressed. The path is configured to provide a chainstay lengthening effect only at those points where this is needed to counterbalance the pedal inputs of the rider; at those points in the wheel travel path where there is a chainstay lengthening effect, the chain tension which results from the pedal inputs exerts a downward force on the rear wheel, preventing unwanted compression of the suspension. The system employs a dual eccentric crank mechanism mounted adjacent the bottom bracket shell to provide the desired control characteristics.

22 Claims, 18 Drawing Sheets

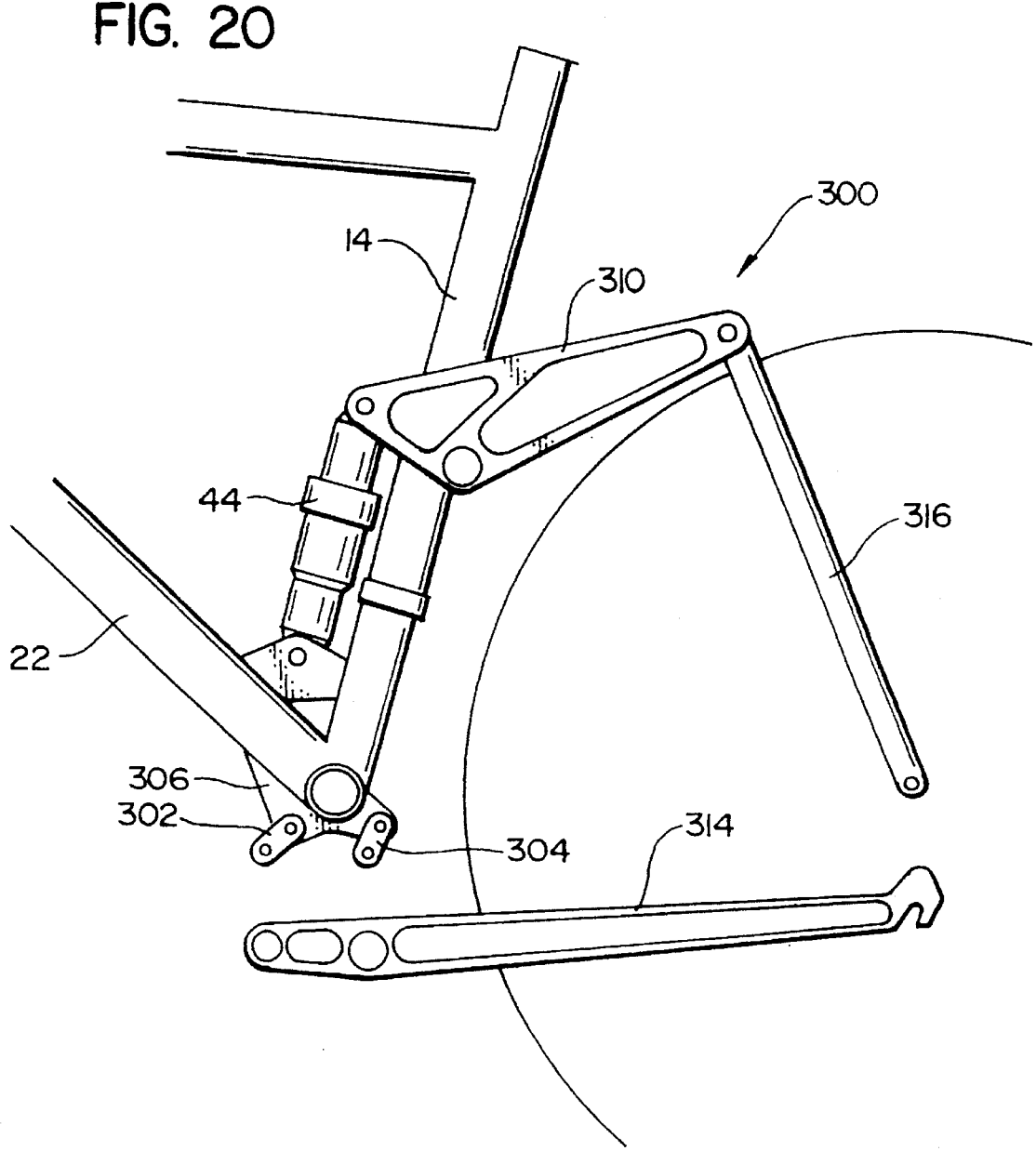

BICYCLE REAR SUSPENSION SYSTEM

FIELD OF THE INVENTION present invention relates generally to bicycles, and more particularly to a rear suspension system which provides efficient energy transmission but still provides compliant suspension action when the bicycle is ridden over rough terrain.

BACKGROUND OF THE INVENTION

Rear suspensions for bicycles are known. However, most of these have not proven entirely satisfactory in practice.

In most prior art rear suspension assemblies, the rear axle pivots about a single point when subjected to the bump force, as when traversing rough terrain. This results in the pedaling forces tending to either compress or extend the spring/damper assembly of the rear suspension. In this respect, then the spring/damper assembly of the rear suspension is affected by the pedal force, some of the rider's energy is needlessly wasted to compress the spring/damper assembly. This effect is illustrated by the common tendency of most prior art rear suspension systems to either lock up or "squat" when the rider pedals. Since these prior art rear suspension systems are generally designed having a single lever arm which pivots about a single quadrant, the lock up or squat generally occurs as a result of chain tension acting on the single lever arm. If the single pivot line of the rear suspension system is above the chain line, the suspension will typically lock up and/or "jack", thereby providing suspension only when the shock or pump force exceeds the chain tension. Conversely, if the single pivot point of the rear suspension system is below the chain line, the system will typically squat since the chain tension is acting to compress the spring/damper assembly of the rear suspension system in the same manner as does the shock or bump force.

SUMMARY OF THE INVENTION

The present invention has solved the problems cited above, and is a bicycle which comprises, broadly, a forward frame section having a crankset mounted thereto, and a compressible rear suspension section, the rear suspension section comprising: means for mounting the rear wheel axle at a spaced distance rearwardly of the crankset, the crankset and the axle being interconnected by a drive chain to which tension is applied by the crankset, and means for moving the rear wheel along a generally S-shaped path comprising a curved lower portion which is at least partially convex on a forward side toward the crankset and a curved upper portion which is at least partially concave on the forward side, as the rear suspension section is compressed.

The S-shaped path may comprise, in sequence, (a) sag position as a result of rider spring mass, (b) a middle portion at the preferred pedaling position in which there is an increasing distance between the axle and crankset so that the tension which is applied to the drive chain in response to rider power inputs exerts a downward force on the axle which balances a downward force which is exerted on the frame section by the rider power inputs, and (c) an upper portion in which there is a decreasing distance, or a reduction in the increase in distance between the axle and the crank set, so that the downward force which is exerted on the axle in response to the rider power inputs decreases as the suspension is further compressed.

The means for moving the rear wheel along the predetermined path may comprise (a) a control arm member having a rearward end to which the wheel is mounted and a forward end, and (b) a pivot assembly mounted to the forward end of the control arm member, the pivot assembly comprising cam means interconnecting the pivot assembly and the forward frame section, the cam means being configured to direct the rear wheel along the predetermined path in response to compression of the suspension system. The cam means may comprise a forward eccentric cam member pivotally mounted to the forward frame section forwardly of the crankset, a rear eccentric cam member pivotally mounted to the frame section rearwardly of the crankset, and a framework mounted to the forward end of the control arm member and being interconnected with the frame section by the eccentric cam members, the eccentric cam members being configured to move the rear wheel along the predetermined path in response to compression of the suspension. The eccentric cam members may each comprise a spindle portion which is mounted in the frame section for rotation about a first axis, and a lobe portion which extends from the spindle portion and defines a second axis of rotation which is offset from the first.

The eccentric cam members may be configured so as to impart a motion to the framework of the pivot assembly in a downward and rearward direction as the suspension begins compression. In the uncompressed condition, the angle at which the lobe portion of the forward eccentric cam extends from the spindle portion thereof may be approximately 90°–145° forward of top-dead-center, and the angle at which the lobe portion of the rear eccentric cam extends is approximately 155°–180° forward of top-dead-center, so that the motion which is imparted to the framework is developed in three sequential phases which correspond to the lower, middle, and upper portions of the wheel path, namely: (1) a first phase in which the lobe portions of the two eccentric crank members rotate from being at a generally greater angle to one another to being generally more parallel to one another, so that the rear wheel axle pivots about a pivot point which is proximate the rear eccentric cam member and there is minimal increase in the change in distance between the crankset and the rear wheel, (2) a second phase in which the lobe portions are generally more parallel to one another, so that the rear wheel pivots about a point which is above the crankset and there is a predetermined increase in the distance between the crankset and the rear wheel, and (3) a third phase in which the lobe portions rotate from being generally more parallel to one another to being at generally greater angle to one another, so that the rear wheel pivots about a point which is proximate the forward eccentric cam member and there is a predetermined decrease in the rate of change of distance between the crankset and the rear wheel.

The predetermined path which is followed by the rear wheel may be a continuous compound curve comprising: (a) a curved middle portion having an averaged radius and a focus on the rearward side of the compound curve, which may be a substantially straight line and (b) a curved upper portion having a second averaged radius and a focus on a forward side of the compound curve. The transition from the lower curved portion to the middle curved portion defines a relatively rapid increase in the distance from the crankset to the axle as the suspension system begins to compress above the preferred pedaling position.

BRIEF DESCRIPTION OF THE DRAWINGS

FIG. 20 is an elevational view similar to FIG. 19, showing the lower swing arm assembly removed from the other components so as to show their interrelation more clearly;

DETAILED DESCRIPTION

A. OVERVIEW

The present invention provides a rear suspension system which will absorb bump forces which are received due to irregular terrain, but which minimizes the compression/extension of the suspension which is caused by the forces which are applied by the rider during vigorous and/or uneven pedaling. This is accomplished by means of a dual eccentric crank mechanism which moves the rear wheel along a predetermined path as the suspension is compressed, so that the chain tension works to counteract the downward forces on the frame during selected phases of the compression cycle.

Figure 1:
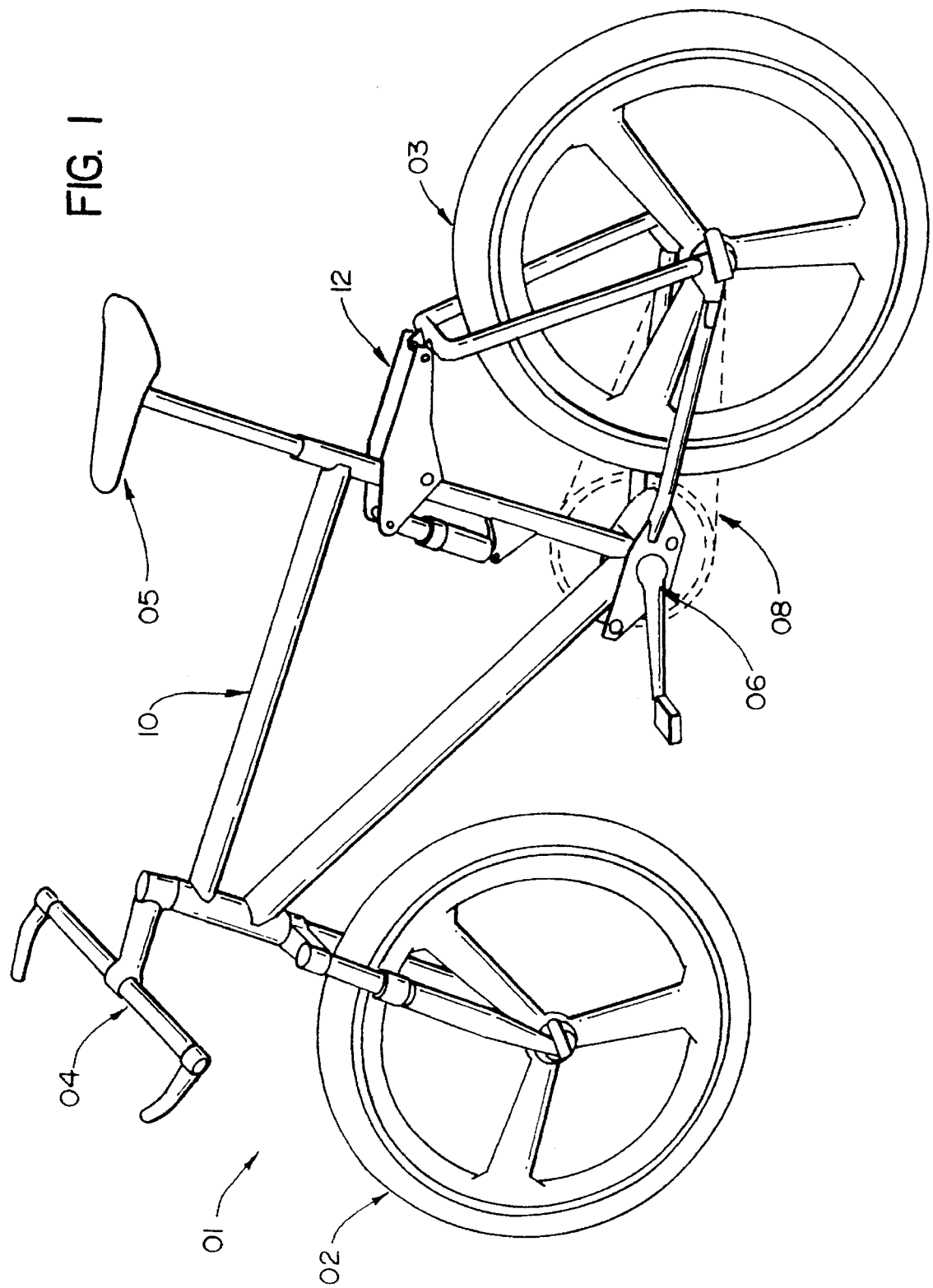
FIG. 1 is a perspective view of a bicycle incorporating a frame and rear suspension system constructed in accordance with the present invention.

FIG. 1 is a perspective view of a bicycle 01 having a frame 10 which incorporates a rear suspension system 12 in accordance with the present invention. The frame and suspension system have attachment fittings for the following components, which are of generally conventional configuration and therefore do not themselves form a part of the present invention: Front and rear wheels 02, 03, handle bar assembly 04, seat assembly 05, crank set 06, chain drive/deraileur system 08.

Figure 2:
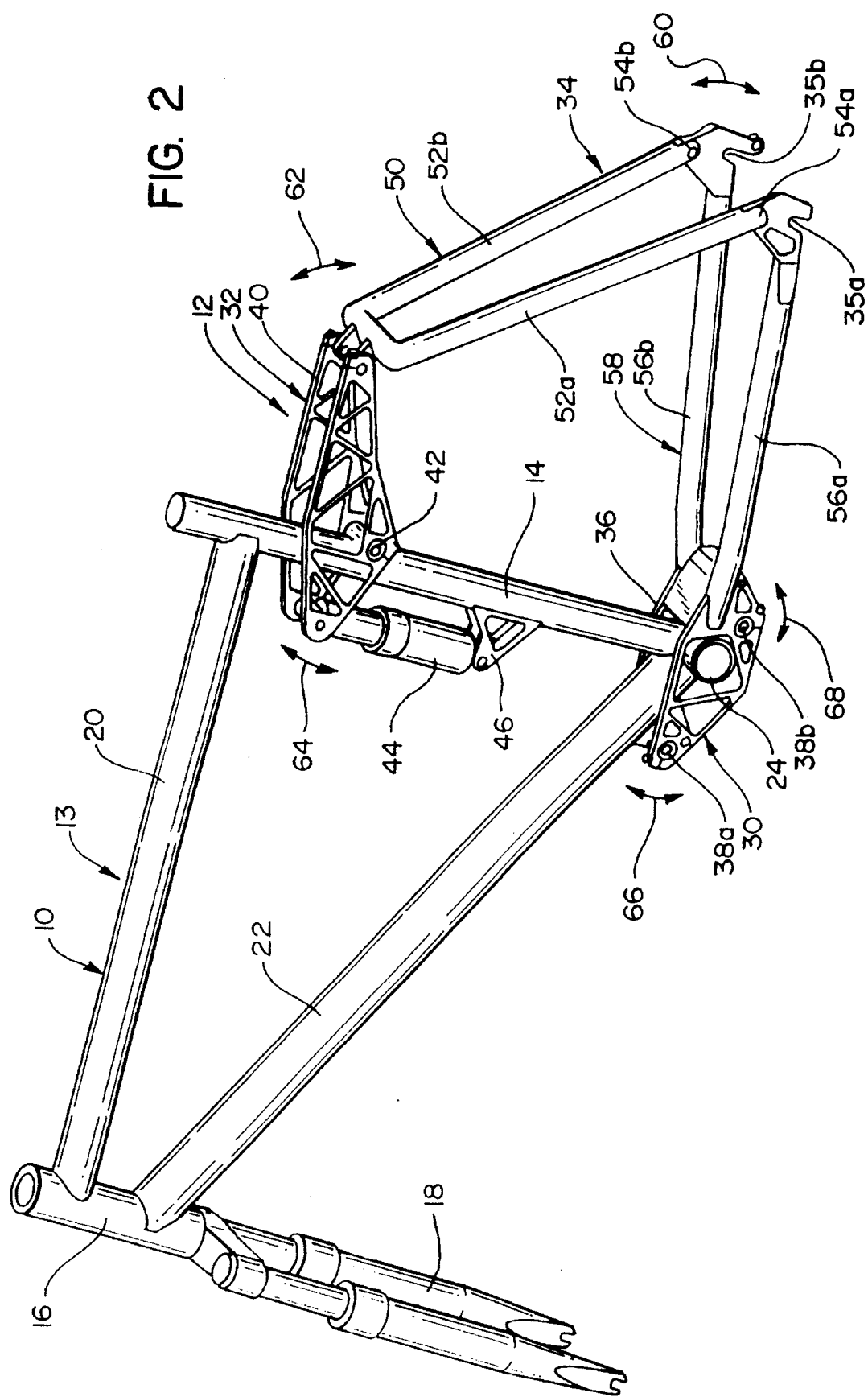
FIG. 2 is a perspective view of the bicycle frame and rear suspension system of FIG. 1, showing these in enlarged detail.

FIG. 2 shows the bicycle frame 10 and rear suspension system 12 in enlarged detail. As can be seen, the example frame which is shown in FIG. 2 is generally similar to a traditional "diamond" frame in overall configuration: The forward frame section 13 comprises a generally vertical seat tube 14 for supporting the rider's mass, while a shorter, generally parallel head tube 16 supports the front fork assembly 18 and handle bars. The seat tube and the head tube are interconnected by a generally horizontal top tube 20 and a diagonally extending down tube 22, and at their lower ends the down tube 22 and the seat tube 14 are mounted to a cylindrical bottom bracket shell 24. The bottom bracket shell extends in a horizontal direction and is configured to receive a conventional crankset (i.e., pedals, crank arms, crankshaft, chain rings, and associated components) by which the drive tension is applied to the drive chain; as used in this description and the appended claims, the term "drive chain" includes not only bicycle chains but also drive belts, toothed belts, and similar power-transmission devices.

Although, as was noted above, the frame assembly which has thus far been described is generally conventional in configuration, and therefore has the advantage of being suitable for use with more-or-less standardized components such as saddles, handlebar stems, and so forth, it will be understood that the suspension system of the present invention may also be employed with bicycle frames which have configurations other than the generally conventional one which is shown herein.

The rear suspension system 12 of the present invention, in turn, comprises three interconnected subassemblies: (1) a lower pivot assembly 30, (2) an upper pivot assembly 32, and (3) a rear swinging arm assembly 34, the rear wheel being mounted by the apex of this latter assembly in axle notches (dropouts) 35a, 35b. As will be described in greater detail below, the lower pivot assembly 30 comprises a framework 36 which is pivotally mounted to the forward frame section by front and rear eccentric crank members 38a, 38b. The upper pivot assembly 32, in turn, comprises a rocker frame 40 which is pivotally mounted to the seat tube of the frame section by a spindle 42. The rocker frame 40 extends both forwardly of and behind the seat tube 14, and the forward end the framework is pivotally mounted to the upper end of a spring and shock absorber 44, the lower end of the shock absorber being pivotally mounted to a bracket 46 which extends from the seat tube 14. The rearward end of the rocker frame 40 is pivotally attached at pivot pins 48a, 48b to the upper end of the upper control arm member 50 of the swinging arm assembly 34. The control arm member is bifurcated so as to form first and second rearwardly extending legs 52a, 52b which correspond somewhat to conventional seat stays in general orientation. At their lower ends, the two leg portions 52a, 52b are pivotally attached at pivot points 54a, 54b to the rearward ends of the two leg portions 56a, 56b of the lower arm member 58, the forward ends of which are fixedly mounted to the framework of pivot assembly 30.

The actual motion which is provided by the system of the present invention is relatively complex, and will be described in detail below. However, the general direction of the suspension motions will be summarized here for the purposes of this overview. As the bicycle is ridden over rough terrain, impact loading which is received at the rear wheel causes the rearward end of the swinging arm assembly 34 to move up and down and along a curved path, as is indicated by arrow 60. Simultaneously, the joint between the arm member 50 and the rearward end of the upper pivot assembly 32 moves up and down and along an arcuate path, as indicated by arrow 62, causing the rocker frame of the upper pivot assembly to pivot around spindle 42. This in turn compresses and unloads the shock absorber 44, between the end of the upper pivot assembly 32 and fixed frame bracket 46.

Simultaneously with these motions, the framework of the lower pivot assembly 30 pivots about the bottom bracket shell on the eccentric crank members 38a, 38b, as indicated by arrows 66, 68. As will be described in greater detail below, this movement determines the curve which the wheel axle follows as the suspension is compressed, and this motion falls generally into three phases: during the first phase, the combined motion of the eccentrics is such that the pivot point of the assembly is near the rear eccentric member; during the second phase both eccentrics move together so as to add a rearward component to the motion of the assembly, the pivot moving to a point above the bottom bracket; during the final phase, the pivot point moves toward the front eccentric member.

The result is that these combined motions provide a "virtual pivot point" which shifts so as to define a complex curve which is followed by the rear wheel as the suspension is compressed. As will be described in greater detail below, this allows the mechanism to employ what is known as "chainstay lengthening effect" at selected points in the compression cycle; in those phases where the chainstay lengthening increases (i.e., there is an effective increase in the distance between the bottom bracket shell 24 and the axle of the rear wheel at 35), tension on the drive chain causes the suspension assembly to provide an upward force on the frame in response to the application of downward force on the pedals. At the position to which the suspension is compressed by rider mass, there is lesser or minimal chainstay lengthening effect, so that there is a lesser or minimal effect of chain tension on the suspension below the preferred pedalling position, so that it remains compliant to unpowered vertical inputs by the rider (i.e., rider weight) and also to the terrain. The net effect of this is that the system is able to "isolate" pedal inputs from terrain inputs, i.e., the suspension will not compress/extend due to forces exerted by the rider when operating the bicycle, but will remain compliant to irregularities of the terrain.

Having provided an overview of the system of the present invention, each of the subassemblies will now be described in greater detail, and this will be followed by a description of the motion which these elements cooperate to provide.

B. LOWER PIVOT ASSEMBLY

Figure 3:
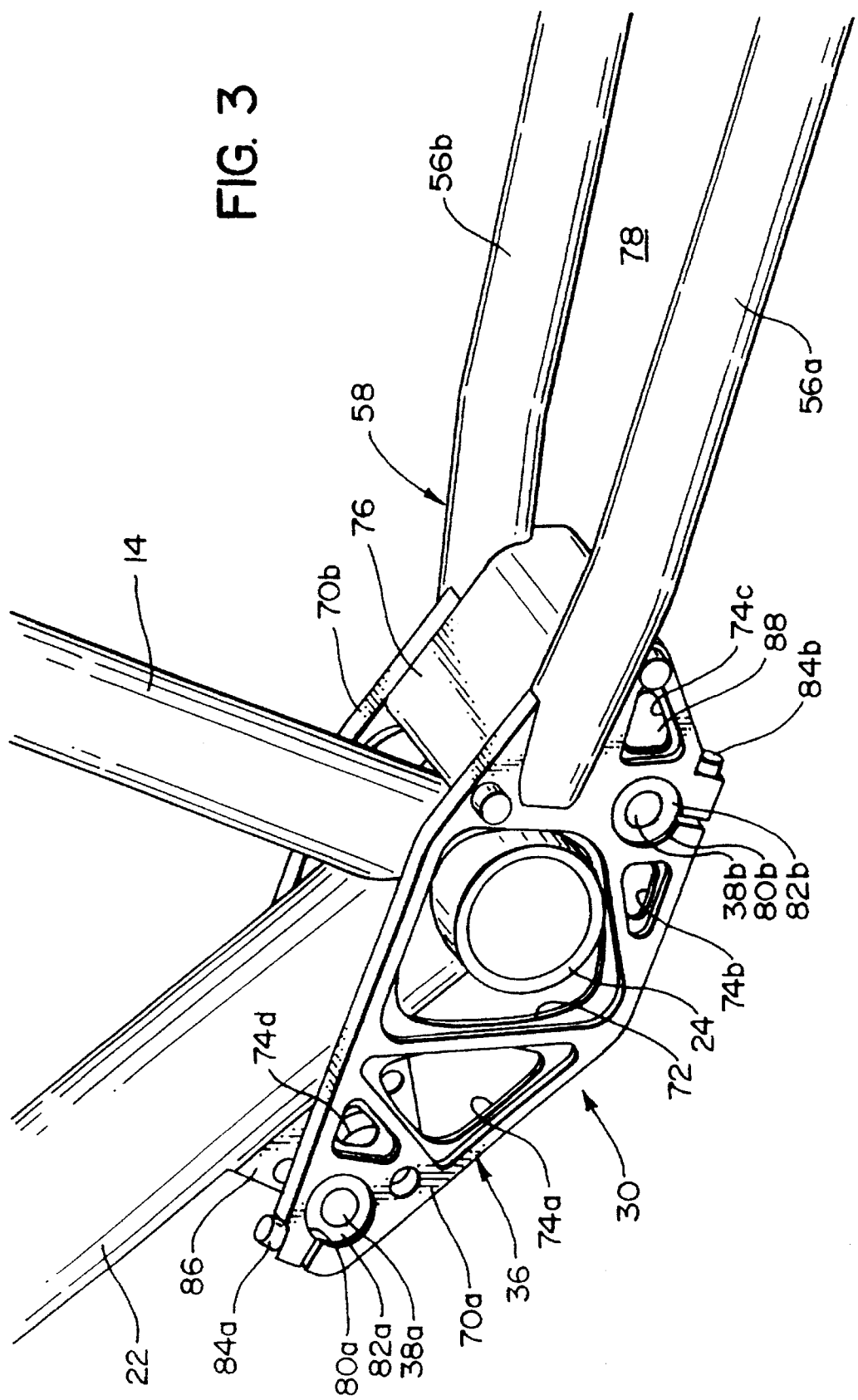
FIG. 3 is an enlarged perspective view of that portion of the rear suspension system which is mounted adjacent the bottom bracket shell of the frame.

FIG. 3 provides an enlarged view of the lower pivot assembly 30 of the suspension system. As can be seen, this comprises two, essentially identical side plate members 70a, 70b. The two side point members are generally planar in shape, and may be machined, cast, or forged, as desired. Each plate member is provided with generally central opening 72 which is sized to receive the bottom bracket shell 24 and to accommodate the range of motion which the dual eccentric mechanism provides relative to the frame section. The plate members are also preferably formed with relief openings or cutouts 74a–74d for the purpose of minimizing weight; these cutouts may have any suitable size and shape, the generally triangular openings with radiused internal webbing which are shown in FIG. 3 having been selected as being structurally superior, but also as providing a distinctive and aesthetically pleasing appearance.

Near their rearward ends, the two side plate members 70a, 70b are fixedly mounted to the forward end of the lower control arm member 58, which is provided with a mounting block 76 which fits into the gap between the side plate members. The two leg portions 56a, 56b of the lower arm member extend rearwardly from this, more or less parallel to the side plate members of the pivot assembly framework so as to form an open area 78 which accommodates the rear wheel.

Circular openings 80a, 80b are provided proximate the forward and rearward ends of each side plate member 70 to receive the ends of the eccentric crank members 38a, 38b and their bushings or bearings 82a, 82b. In the embodiment which is illustrated, the outer ends of the eccentric crank members and the associated bearings are retained in the framework by pinch bolts 84a, 84b. The main spindle portions of the two eccentric crank members, in turn, are supported for pivoting motion in forward and rear frame lugs 86, 88 (see also FIG. 7B) and bushings/bearings 89a, 89b, these being mounted, respectively, to the down tube 22 and seat tube 14. The specific relationship and orientation of the eccentric crank members will be described in greater detail below, however, it may be observed from FIG. 3 that the mounting point for the front crank member 38a is positioned forwardly and somewhat above the cylindrical axis of the bottom bracket shell 24, while the rear eccentric crank member is positioned somewhat behind and below this. The axes of all three (i.e., the bottom bracket shell and the two eccentric crank members) are thus spaced apart from one another, and extend in parallel directions.

C. UPPER PIVOT ASSEMBLY

Figure 4:
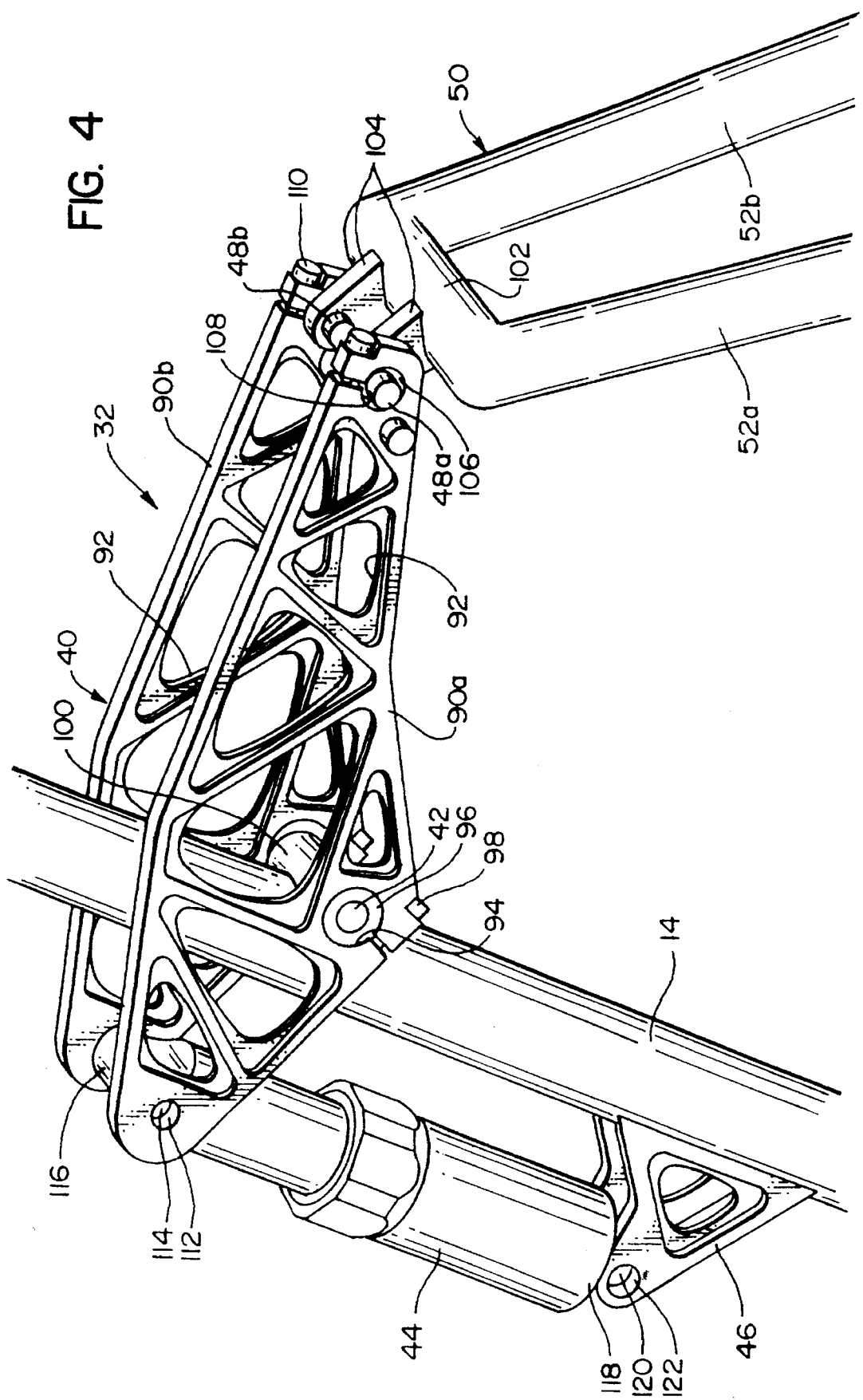
FIG. 4 is an enlarged perspective view of that portion of the suspension system which mounts adjacent the upper end of the saddle tube of the frame, and which incorporates the shock absorber/spring of the system.

FIG. 4 shows the upper pivot assembly 32 in enlarged detail. As can be seen, this somewhat resembles the lower pivot assembly in that the framework 32 is made up of first and second side plate members 90a, 90b which are arranged parallel to one another and extend in the direction of the longitudinal axis of the bicycle. As with the bottom pivot assembly, the plate members 90a, 90b are provided with a series of cutouts 92 to reduce weight.

In a middle portion of the framework, the side plate members are provided with openings 94 which accommodate the axle or spindle 42 and its associated bearing or bushing 96, these being retained in the plate members pinch bolts 98. The spindle 42 extends through a cooperating bore in a frame lug 100 which is formed on the seat tube 14. However, unlike the eccentric crank members of the lower pivot assembly, spindle 42 is a straight axis member which provides a single axis of rotation.

The rearward end of the framework 40 is pivotally mounted to the upper end of upper control arm member 50. In the embodiment which is illustrated, the upper ends of the two leg portions 52a, 52b are joined by a crossbar 102, from which first and second plates 104 extend into the gap between the two side plate members 90a, 90b. The extension plates 104 are provided with cooperating bores (not shown) for the inner ends of the two pivot pins 48a, 48b, the outer ends of the pins and their associated bushings 106 being retained in openings 108 by pinch bolts 110.

At the forward end of the framework, the two side plate members 90a, 90b are provided with bores 112 which receive a pivot pin 114 which extends through a bore (not shown) formed in the end 116 of the shock absorber. The lower end 118, of the shock absorber is pivotally mounted to the frame tube by a second pivot pin 120 which extends through a bore 122 formed in the protruding end of frame bracket 46.

The spindle 42 and the pivot pins 48a and 48b 114, and 120 are arranged so that their axes all lie parallel to one another.

"Shock absorber" 44 is preferably of a conventional type, such as a "Fox" or Risse bicycle rear spring and damper unit. Other shock absorbing mechanisms having suitable spring and damping characteristics may be substituted for that which has been described above.

D. SWINGING ARM ASSEMBLY

Figure 5:
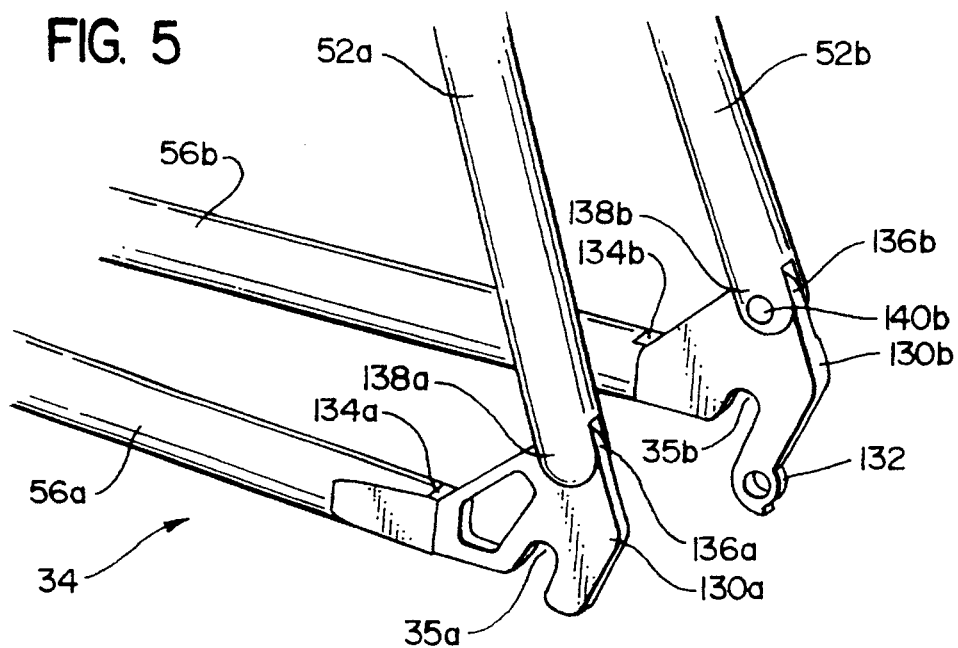
FIG. 5 is an enlarged perspective view of the rearward portion of the suspension system which provides the mounting points for the rear wheel of the bicycle.

FIG. 5 shows the rearward end of the swinging arm assembly 34 in enlarged detail.

The apex of the assembly is provided by left and right axle brackets 130a, 130b, which arc somewhat similar in overall configuration to the rear axle dropouts which are used in conventional bicycle frames, and have slots/notches 35a, 35b in which the axle is received. The right axle mount bracket 130b may also be provided with a deraileur mounting lug 132.

The forwardly extending tang portions 134a, 134b of the axle mount brackets (dropouts) are received in and fixedly mounted to the leg portions 56a, 56b of lower arm member 58. The upper corners 136a, 136b of the brackets, in turn, are received in the forked lower ends 138a, 138b of the legs 52a, 52b of upper arm member 50, and are mounted thereto by pivot pins 140a (not shown) and 140b. The pivot axis provided by pins 140a, 140b lies parallel to those of the other pivot points in the system.

E. OPERATION i. Chainstay Lengthening Effect

As was noted above, the components of the suspension system cooperate so that forces which are exerted by the rider on the pedals do not result in compression/extension of the suspension, while the suspension remains compliant to bumpforces which result from passage over the underlying terrain. This is achieved by means of the dual eccentric linkage which provides a specific vertical path for movement of the rear wheel, which produces a varying degree of "chain lengthening effect" in different phases of the compression cycle.

The forces which are applied to the suspension systems are as follows: (1) Mass of rider or "un-powered" input (vertically downward force on seat and/or bottom bracket center axis); (2) Pedal force of rider or "powered input" (vertically downward force and/or turning moment about bottom bracket spindle axis which applies a forward force to the rear wheel as a result of chain tension); (3) Combined force of spring and damper (upward on frame and downward on rear wheel center axis); and (4) Vertical terrain input (slightly backward and/or upward on rear wheel center axis). As part of the present invention, it has been found that by producing a specific vertical path for the movement of the rear wheel, chainstay lengthening can be used to balance the first three of these forces, so they can be isolated from the fourth force.

The "balancing out" of the powered inputs is achieved by identifying those points in the compression cycle of the suspension at which the powered inputs occur, and applying a "chainstay lengthening" affect at these points so as to counterbalance the inputs. As was noted above, "chainstay lengthening" refers to the increase in distance between the bottom bracket and the wheel axle which occurs as a suspension is compressed. In a suspension system which causes the chainstay length to increase when the wheel is moved vertically, a downward force will develop on the wheel when the chain is tensioned, i.e., by the rider applying the powered inputs at the pedal. The greater the increase in chainstay length for a given vertical wheel displacement, the greater the downward force on the wheel when the chain is tensioned. However, chainstay lengthening which develops throughout the range of suspension travel, as occurs in many known systems, where it is unnecessary and undesirable because it causes the bike to "back-pedal" when the wheel is moved vertically by the terrain; it also requires a longer chain and rear deraileur so that there will be enough chain slack to make up for the change in distance. However, with no chain tensioning it is not presently possible to provide a vertical upward force on the frame which opposes the downward pedaling force of the rider.

As part of the present invention, it has been determined which segments of the wheel travel path correspond with the greatest compressive force on the suspension from rider pedal input, and the shape of the wheel path has been designed so that the counteracting chainstay lengthening occurs only at those points where it is needed. The breakdown of the wheel path in this regard is as follows: The mass (i.e., the weight) of the rider compresses the suspension for the first part of the suspension travel and brings the wheel to the optimum position for pedaling, this being referred to herein as the "preferred pedaling position"; this initial compression of the suspension is referred to as "sag". With minimal change in chainstay length during this phase, the vertical pedal force of the rider will apply either (a) no vertical force on the wheel of the frame, or (b) a downward force on the frame. The downward force on the frame is most noticeable when the rider is standing while pedaling or pedaling unsmoothly. In a non-chainstay lengthening suspension such as the low pivot systems which are known in the art, downward force in the frame causes undesirable compression of the suspension past the preferred pedaling position and results in a loss of pedaling efficiency. In the present invention, however, chainstay lengthening is applied at this point in the wheel travel, so that this downward force on the frame is opposed by the downward force on the wheel as a result of chain tension acting against the increase in chainstay lengthening.

Directly above the preferred pedaling position is where the greatest chainstay lengthening is applied to oppose vertical downward rider pedal inputs which would ordinarily cause the suspension to compress. As the wheel moves from this position towards the top of its path, the increasing resistance of the suspension spring unit (e.g., the shock absorber) assists the chainstay lengthening effect in opposing rider pedal inputs. For this reason, progressively less chainstay lengthening is required as the wheel moves toward the top of its path. The top segment of the wheel path is designed so that almost no chainstay lengthening occurs towards its top, where the opposing spring force is the greatest.

The wheel path which is provided by the present invention may be contrasted with those which are exhibited in suspension systems which are known in the prior art. Low pivot suspensions are those with the pivot point at or near the bottom bracket; these systems employ very little chainstay lengthening and therefore allow undesirable movement of the suspension at wheel positions above the preferred pedaling position. High pivot designs, by contrast, use chainstay lengthening to oppose the vertical rider inputs, but cause too much lengthening, especially when used in a long travel (over three inches) system. Furthermore, systems of this type tend to "over-control" the rear wheel under hard pedaling, by forcing it toward the bottom of the suspension stroke when the wheel is below the preferred pedaling position. Thus, with both types of known systems, pedaling forces are allowed to compress/extend the suspension system, resulting in a loss of pedaling efficiency and power.

It would seem from this information that a pivot point halfway between the high and low positions would result in optimized characteristics, but this is not feasible in practice because of the many variations in riding position and pedaling techniques (e.g., sitting or standing, "spinning" or "pounding", and so forth), and so a more encompassing solution is required. The present invention achieves such a solution by employing a "virtual" pivot point which provides characteristics similar to a low pivot system at the top and the bottom of the wheel path, and similar to a high pivot system when the wheel is located directly above the preferred pedaling position, where the greatest chainstay lengthening effect is needed.

ii. Dual Eccentric Linkage

Figure 6:
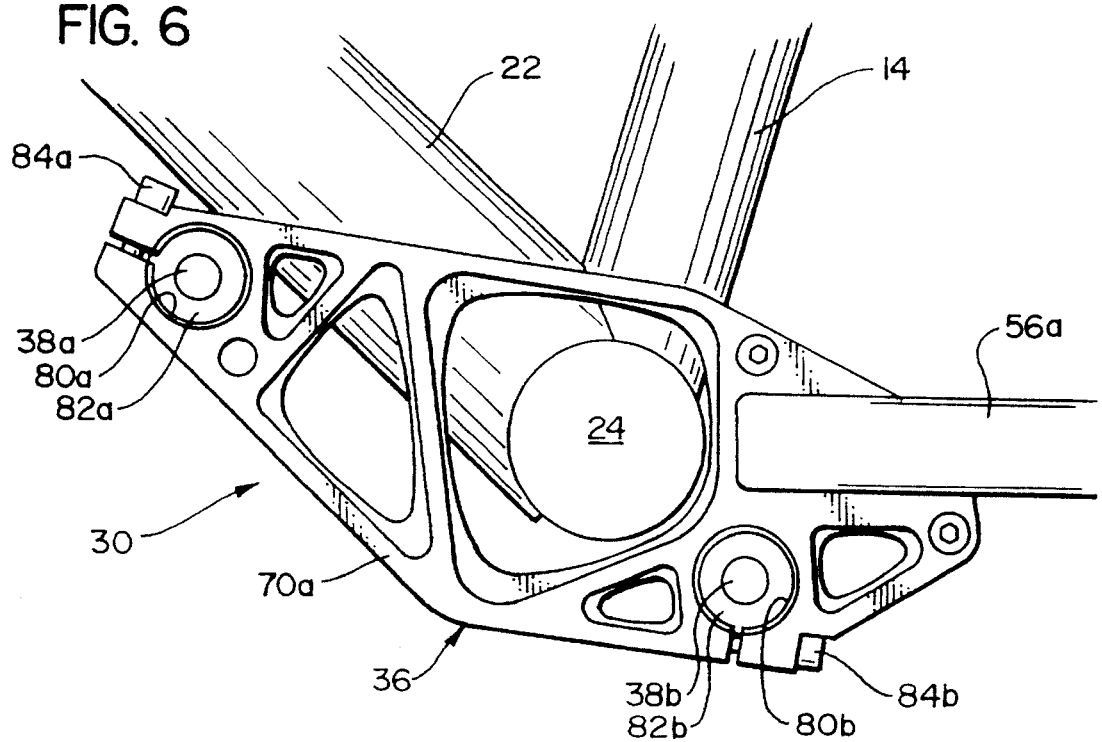
FIG. 6 is an elevational view of the bottom pivot portion of the suspension system.

The dual eccentric linkage which serves (in combination with the other components) to define the wheel travel path is part of the bottom pivot assembly 30. This assembly and the general orientation of the forward and rear eccentrics 38a, 38Ab can be seen in the elevational view of FIG. 6.

Figure 7A:
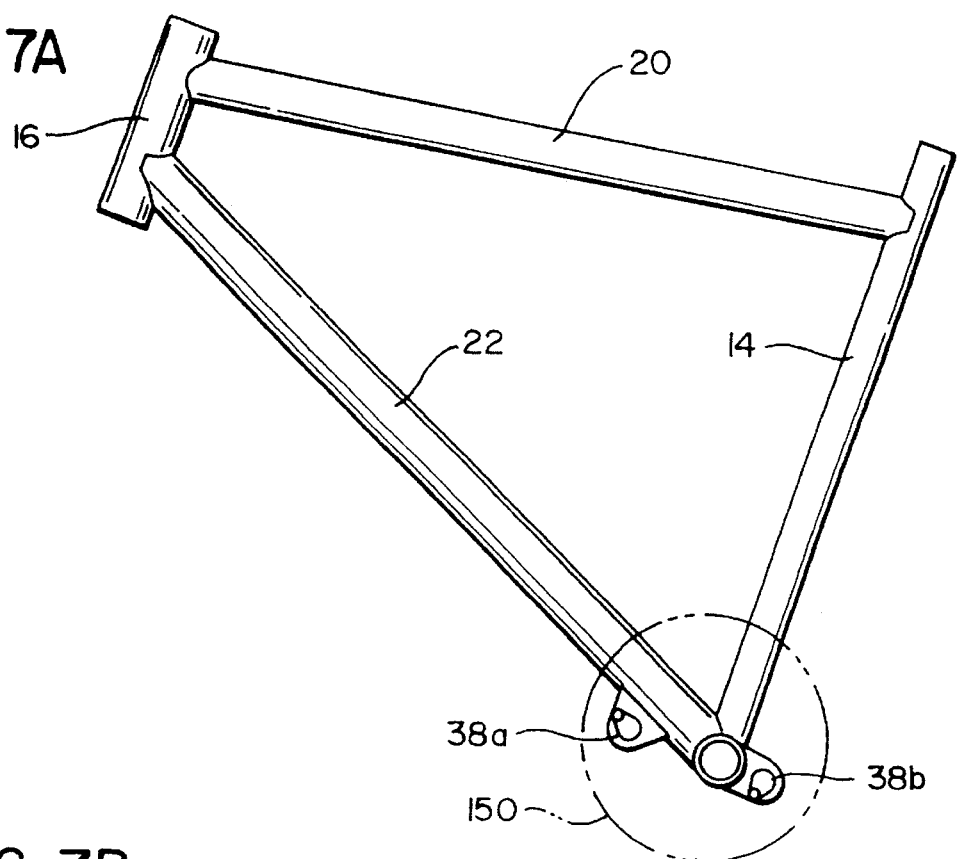
FIG. 7A is an elevational view of the frame of FIG. 2 showing the bottom pivot portion of the suspension system partially disassembled to expose the eccentric crank arms which interconnect this portion of the assembly to the bicycle frame.
Figure 7B:
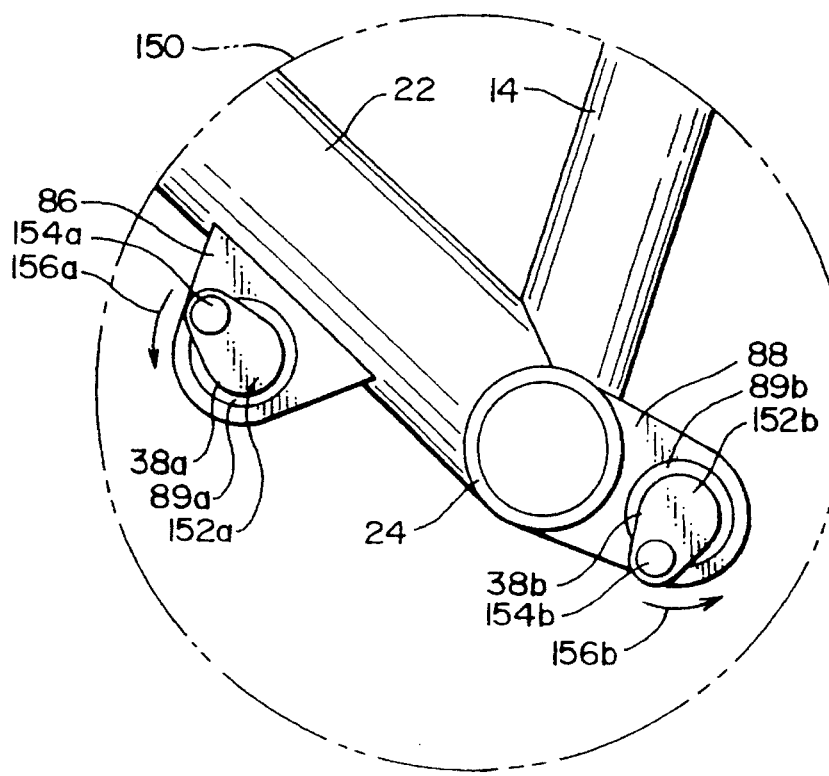
FIG. 7B is an enlarged view of the bottom pivot portion of the rear suspension assembly which is shown in FIG. 7A.

FIGS. 7A–7B, in turn, show the assembly with the framework 40 removed so as to expose the crank members. As can be seen in the enlarged area 150, the eccentric members 38a, 38b (the right side of the assembly being mirror-image identical to the side which is seen) comprise spindle portions 152a, 152b which are supported for rotation about their primary axes in frame brackets 86, 88 and bearings 89a, 89b, and offset lobe portions 154a, 154b which are received in the corresponding openings 80a, 80b of the framework (see FIG. 6), and which provide secondary axes which are offset from the axes of the spindles. In the exemplary embodiment which is illustrated, the spacings between the primary and secondary axes is approximately 7 inches, with the range of possible spacings being from about 1" or less to about 24". Thus, as the suspension is compressed, the spindle portions rotate within the frame section, and the offset lobe portions 154 swing through arcuate paths, as indicated by arrows 156a, 156b.

FIG. 7B also shows the relative orientation of the two crank members when the suspension is in its initial, uncompressed condition; in particular, in this condition the forward eccentric crank member 38a is aligned in an upward and forward direction, so that its lobe portion is at about 90° from top dead center, while the rear eccentric crank member 38b is aligned so that its lobe portion extends approximately 165° degrees from top dead center.

iii. Interaction of the Eccentric Crank Members During the Three Phases of Wheel Travel In the schematic views of FIGS. 7A–7C, the forward eccentric crank member is represented by front link 160a, and the rear eccentric crank member is represented by back link 160b. The rotation of the links for a given phase of the compression cycle is shown by the arcs which are indicated by the associated arrows.

Figure 8A:
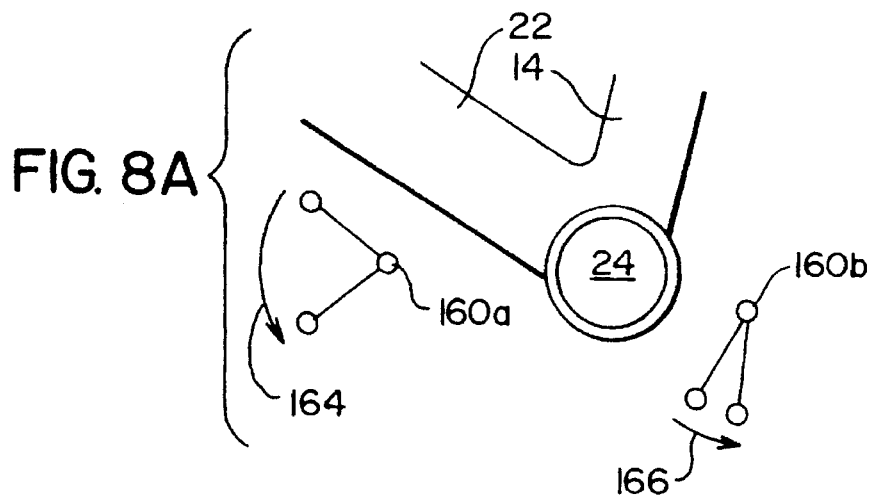
FIG. 8A–8C are sequential, diagrammatical views illustrating the manner in which the motions of the two eccentric crank arms cooperate as the suspension is compressed to provide a shifting pivot point for the suspension assembly and a prescribed path for the motion of the rear wheel axle.

FIG. 8A shows the linkage movement for the first (bottom) third of wheel travel. Since there is an approximate 90° difference in the alignment between the two eccentrics in the unloaded condition, the first third of wheel movement causes more rotation of the front link 160a (as indicated by arrow 164) than of the rear link 160b (as indicated by arrow 166). This gives the wheel travel path a focus point (which is referred to hereinafter as focus point "A") which is located near the back link 160, so that this is the point about which the wheel is primarily pivoting. Since the back link is mounted near the bottom bracket, this results in minimal chainstay lengthening, chainstay lengthening not being desired during this phase because the suspension is simply "sagging" down to the preferred pedaling position under the rider's mass.

Figure 8B:
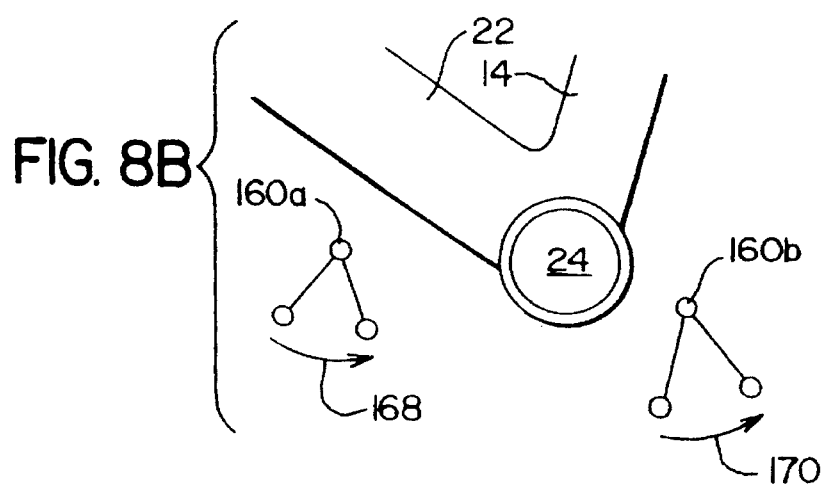

FIG. 8B shows the linkage operation during the middle third of wheel travel. This phase begins at or near the preferred pedaling position, so that this is the point at which the greatest resistance to compression of the suspension by the powered inputs is needed. As can be seen in FIG. 8B, at the beginning of this phase the two links no longer extend at right angles to one another, but have moved to position where they are roughly parallel. As a result, both links rotate a similar amount during this phase, as indicated by arrows 168, 170, and their combined motion causes more movement of the rear stay in a generally rearward direction while it is pivoting. This results in a shift of the virtual pivot point to a location significantly above the bottom bracket (to focus "B") and results in an enhanced chainstay lengthening effect, so that tension which is applied to the chain by the pedal inputs causes a downward force on the wheel which counterbalances the forces which are exerted on the frame through the bottom bracket. In practice, this arrangement has been found to be so effective that the rider can apply extremely irregular pedal inputs or even jump on the powered (i.e., forward) pedal without causing significant compression of the suspension beyond the preferred pedaling position.

Figure 8C:
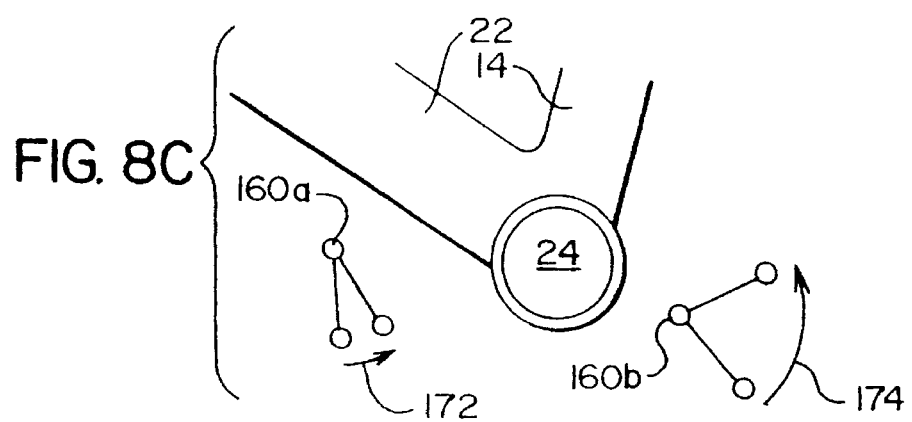

The final phase of motion is shown in FIG. 8C, during which the suspension moves towards its fully compressed condition. At the beginning of this phase, at which the wheel is located significantly above the preferred pedaling position, the links 160a, 160b have moved back to an orientation which is roughly at right angles (90°) to each other, with the result that movement of the back link becomes greater relative to movement of the front link, as indicated by arrows 174 and 172. This shifts the focus of the wheel movement (referred to hereinafter as focus "C") and moves the pivot point closer to the front link 160a, reducing the chainstay lengthening effect. The downward force which the chain tension produces on the wheel therefore tapers off during this phase, although the force which is exerted by the spring will simultaneously increase and take up the load (i.e., oppose rider powered inputs). This enables the suspension to be compliant to external (unpowered) inputs caused by irregularities in the terrain, while minimizing the effects of the rider's pedal inputs.

iv. Wheel Travel Path

FIGS. 8–11 illustrate the manner in which the movements of the linkage described above serve to control and define the path which is traveled by the rear wheel as the suspension system is compressed.

Figure 9:
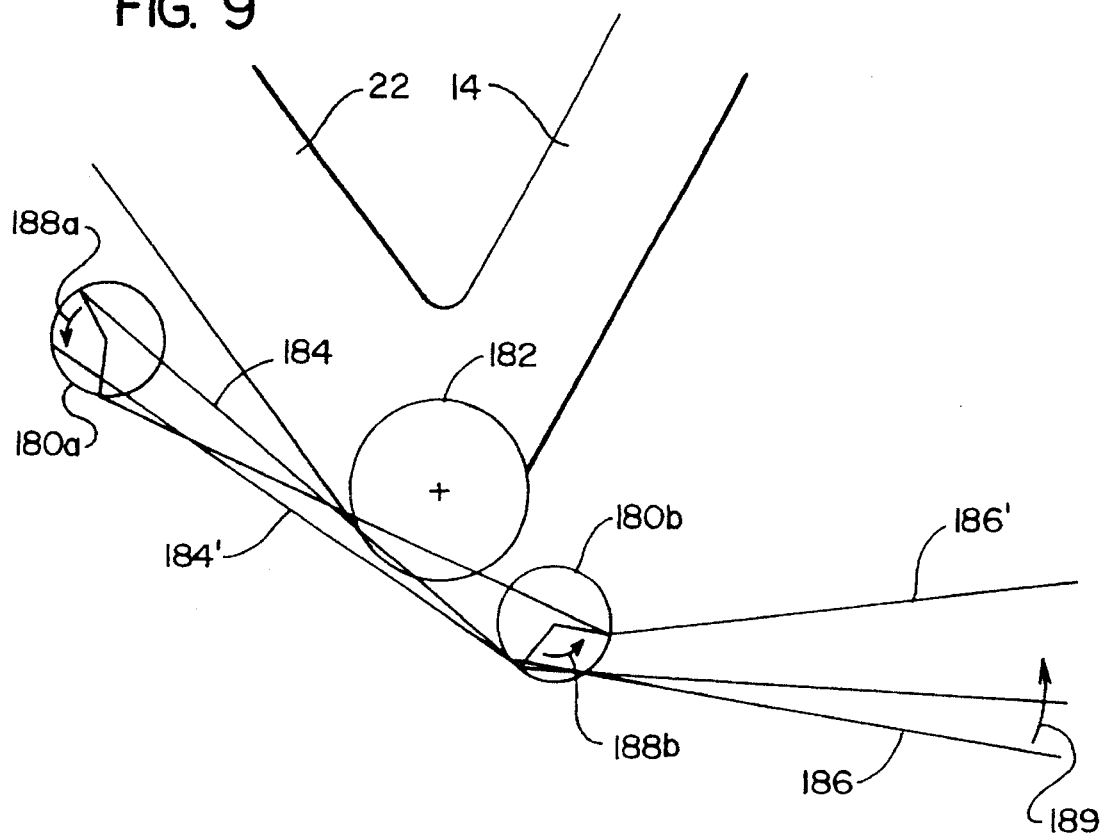
FIG. 9 is a diagrammatical view of the bottom pivot assembly of the suspension system, illustrating the alignment of the components at the beginning and end of the compression cycle.

FIG. 9 is a schematic view which illustrates the relationship between the forward and rear eccentric crank members at the beginning and end of the compression cycle. The links 160a, 160b are indicated schematically by circles 180a, 180b, the primary axes (i.e., the axes of the spindle portions of the eccentrics) being indicated at the centers of the circles, while the secondary axes (i.e., those of the eccentric lobe portions) are indicated by points on the perimeters. The axis of the bottom bracket assembly, in turn, is indicated at the center of circle 182, which corresponds to the bottom bracket shell 24.

As was described above, the lobes of the eccentric crank members are mounted to the lower pivot assembly, and the rear axle is carried at the end of the arm members which extend from this assembly. Thus, referring to FIG. 9, it can be seen that the distance between the lobe portions of the two eccentric members can be represented by a first line segment of 184 of fixed length, while the distance from the rear eccentric to the axis of the rear wheel defines a second line segment 186.

With further reference to FIG. 9, it can be seen that as the suspension compresses, the forward and rearward links rotate as indicated by arrows 188a and 188b, with the result that the rear axle is moved rearwardly and upwardly as indicated by arrow 189; as this is done, the rear wheel axle (at the end of 186–186') follows a specific path such that the distance between the wheel axle and the axis of the crankset (i.e., the chainstay length) varies to a predetermined degree.

Figure 10:
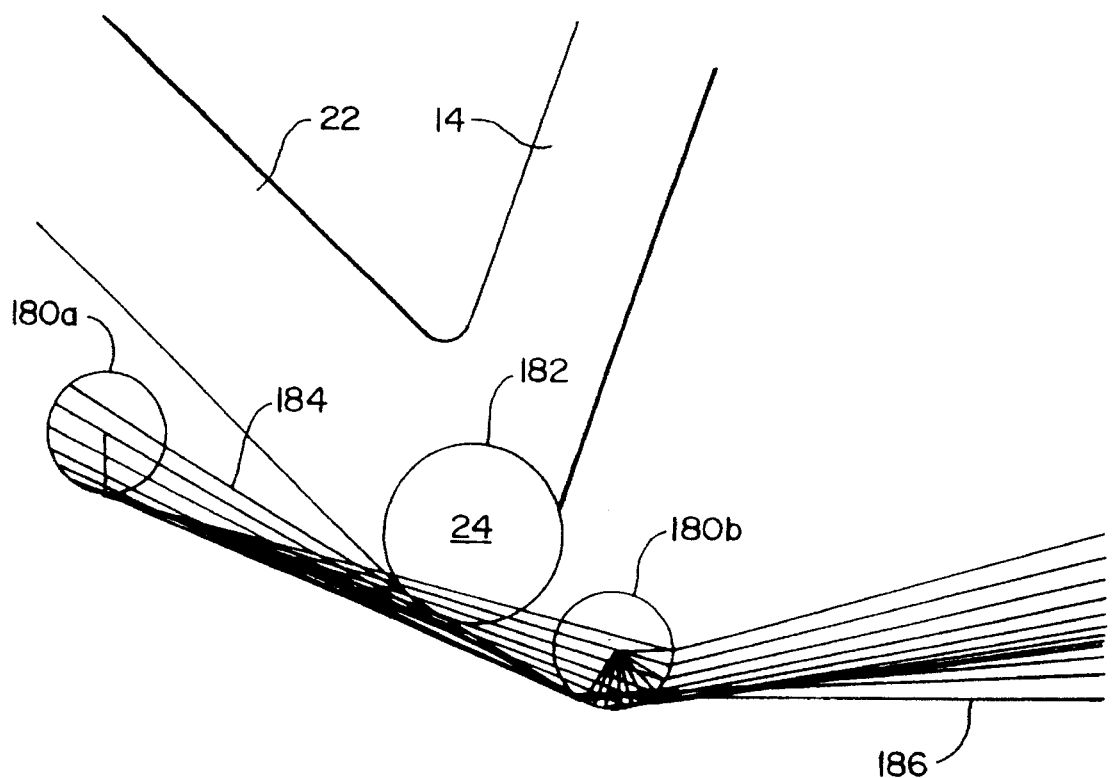
FIG. 10 is a view similar to FIG. 9, showing the alignments at sequential, 10° increments.
Figure 11:
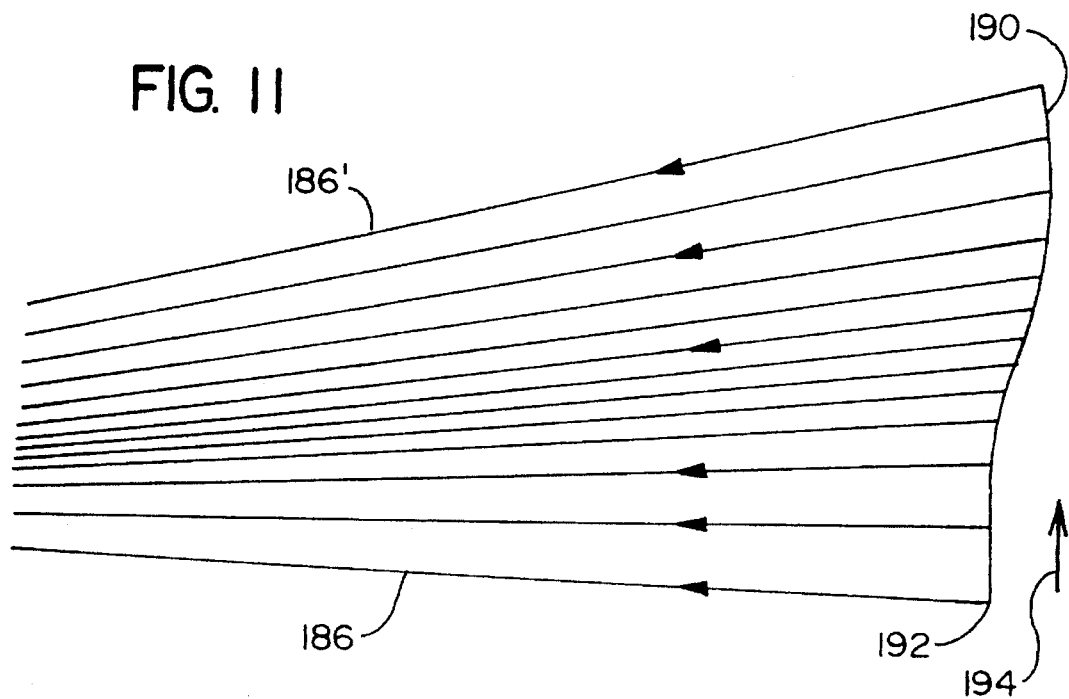
FIG. 11 is a view similar to FIG. 10, but showing the rearward end of the assembly and the manner in which the changes in alignment between the components produces the prescribed path for motion of the wheel axle.

FIG. 10 is similar to FIG. 9, except that it shows the sequential positions (at roughly 10° intervals) of the two line segments throughout the compression cycle. FIG. 11, in turn, shows the path 190 which is followed by the wheel axle at the rearward end of the fixed length line segment 186–186', the general upward direction of the motion of the axle being indicated by arrow 194.

As can be seen, toward the lower end of this path the curve 190 (although somewhat arcuate) extends primarily in a vertical direction, with the result that there is relatively little change in distance between the wheel axle and the bottom bracket during this phase, and hence little or no chainstay lengthening. Then, above this, the curve bends strongly in a rearward direction, indicating rearward movement of the axle; this increases the distance between the axle and the crank set, and hence causes the relatively pronounced chainstay lengthening effect during this phase. Finally, towards its upper end, the curve 190 begins bending forwardly again, causing a reduced chainstay lengthening effect during the final phase of compression.

Figure 12:
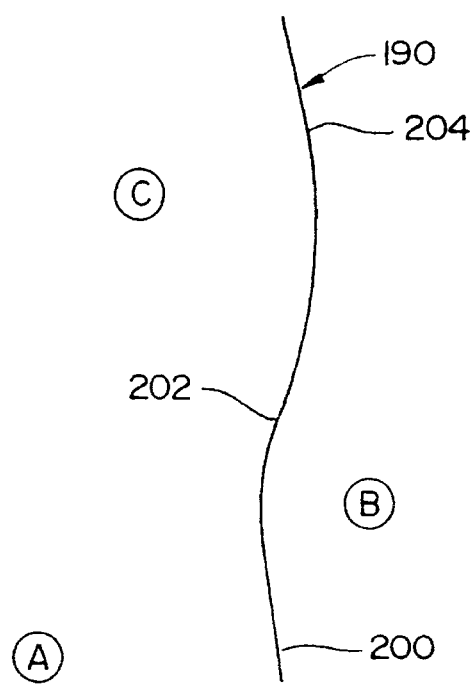
FIG. 12 is a graphical view illustrating the segments of the path which are followed by the rear wheel axle during the different phases of compression of the suspension system.

FIG. 12 shows the compound curve 190 in enlarged detail, and serves to illustrate the relative shift in position between the three foci "A", "B", and "C" during the three distinct phases of suspension travel which have been described above. Focus "A" of the bottom portion 20 of the wheel travel may be on the forward (i.e., chain tensioning) side of the compound path 190. Then, during approximately the middle third portion 202 of the path, the focus "B" of the compound curve shifts to behind the wheel travel path, away from the chain tensioning side. Finally, during the top portion 204 of the wheel travel path, the focus "C" again shift forwardly to the chain tensioning side effect which serves produces a varying chainstay lengthening side of the curve. For reasons discussed above, this compound curve produces a varying chainstay lengthening effect which serves to balance out the rider's pedal inputs. Although the curved portions of the wheel path are not simple arcs, each can be considered as having an averaged radius, with a smaller radius producing a tighter curve and vice-versa. Thus, it can be seen that the middle portion of the path (Focus "B") has a smaller radius than the other two portions (Foci "A" and "C"). This yields a fairly abrupt transition to the chainstay lengthening phase immediately above the preferred pedalling position, precisely where it is most needed to counteract the pedal inputs.

It should also be noted that the primary desirable characteristics of the suspension are provided by the pronounced chainstay lengthening effect (focus "B") at the preferred pedaling position, followed by the "tapering off" of the chainstay lengthening effect in the next phase above this (focus "C"). The lower third of the defined wheel travel path (i.e., focus "A") may therefore be regarded as optional (and may be consequently deleted in many embodiments), in that the enhancements which it provides are incremental as compared to those which are provided by the next two phases of the cycle.

Thus, for example, the lower phase (focus "A") may be omitted in many embodiments, so that there are only lower and upper curved portions of the S-shaped path. The preferred pedalling position is preferably located proximate or slightly below the inflexion point or zone between these two phases, so that there is an increase in the chainstay lengthening effect (i.e., an increase in the rate of chainstay lengthening) as the axle moves upwardly toward the preferred pedalling position, and then a decrease in the chainstay lengthening effect (i.e., a decrease in the rate of increase) as the axle moves into the upper portion of the curve. Also, in this embodiment, the radius of the lower portion of the S-shaped path may be selected to approximate inifinity, with the result that this part of the path may be virtually straight and angled slightly to the rear.

Figure 13:
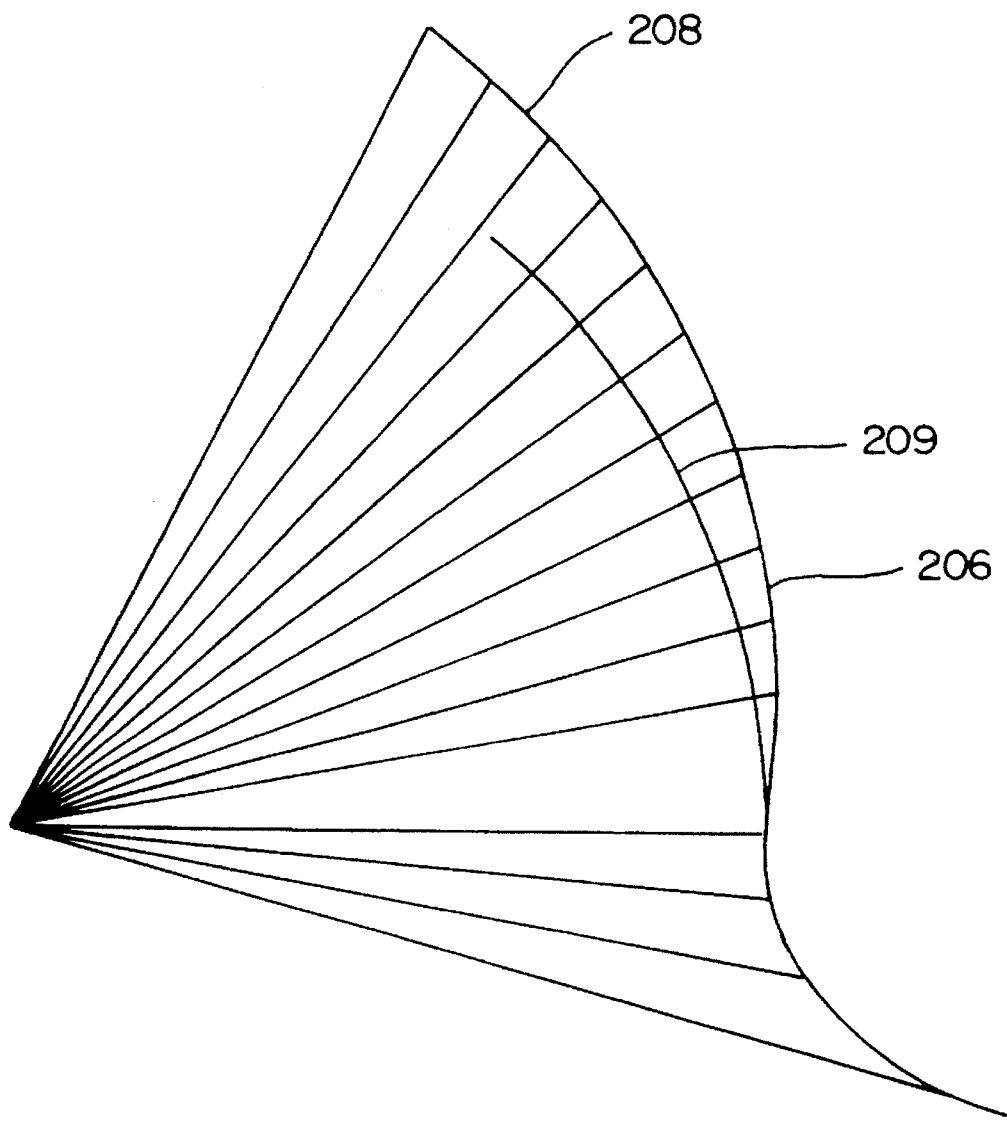
FIG. 13 is a graphical representation of a curve which is generated based on the data set forth in Table A of the specification, this being a rough mathematical approximation of the wheel travel path which is shown in FIGS. 11–12.

As was noted above, the wheel travel path is generally S-shaped, having an upper portion which, as viewed from the source of the chain tension, is generally (or at least partially) concave, and a lower portion which, viewed from the source of the chain tension, is generally (or at least partially) convex. In the embodiment which is illustrated, the concave portion of the curve 206 is joined to the convex portion at a single point of inflection. FIG. 13 illustrates a curve 208 which represents a rough mathematical approximation to the curve having the above description, this having been produced for the particular embodiment of the suspension system which has been described above and the pertinent data relating to each step of the compression/extension phases of this curve being listed in the following Table A. For reference purposes, a curve 209 of constant radius is also shown in FIG. 13. It will be recognized, however, that this data is only a very rough mathematical approximation of the curve which is followed by the wheel travel path.

TABLE A

CURVE 1

| THETA o | RADIUS | THETA | A | Ac | RADIUS C |
|---|---|---|---|---|---|
| .000 | 16.75 | 1.571 | 10.66338 | 10.66 | 16.74469 |
| .090 | 17 | 1.661 | 10.23605 | 10.37352 | 17.22831 |
| .180 | 17.25 | 1.751 | 9.852659 | 10.08704 | 17.66036 |
| .270 | 17.5 | 1.841 | 9.506755 | 9.800563 | 18.04084 |
| .360 | 17.75 | 1.931 | 9.193098 | 9.514084 | 18.36976 |
| .450 | 18. | 2.021 | 8.90738 | 9.227606 | 18.64711 |
| .540 | 18.25 | 2.11 | 8.646026 | 8.941127 | 18.8729 |
| .630 | 18.5 | 2.201 | 8.406048 | 8.654648 | 19.04712 |
| .720 | 18.75 | 2.291 | 8.184927 | 8.368169 | 19.16977 |
| .810 | 19 | 2.381 | 7.980523 | 8.08169 | 19.24086 |
| .900 | 19.25 | 2.471 | 7.79101 | 7.795211 | 19.26038 |
| .990 | 19.5 | 2.561 | 7.614819 | 7.508732 | 19.22833 |
| 1.080 | 19.75 | 2.651 | 7.450591 | 7.222253 | 19.14472 |

CURVE 2

| THETA o | RADIUS | THETA | RADIUS C |
|---|---|---|---|
| .000 | 16.75 | 1.571 | 16.012 |
| −.090 | 16.845 | 1.481 | 17.45461 |
| −.180 | 17.9 | 1.391 | 18.89722 |
| −.270 | 21.207 | 1.301 | 20.33983 |

R = 16.012–16.029*theta

F. ADDITIONAL EMBODIMENTS i. Eccentric Crank Members

Figure 14A:
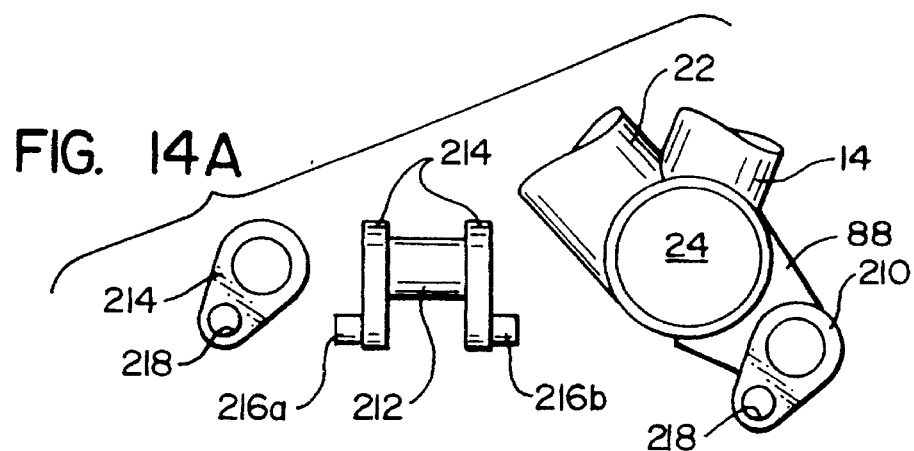
FIGS. 14–14B are exploded views showing first and second embodiments of eccentric crank mechanisms for use in the suspension system shown in FIGS. 1–5.
Figure 14B:
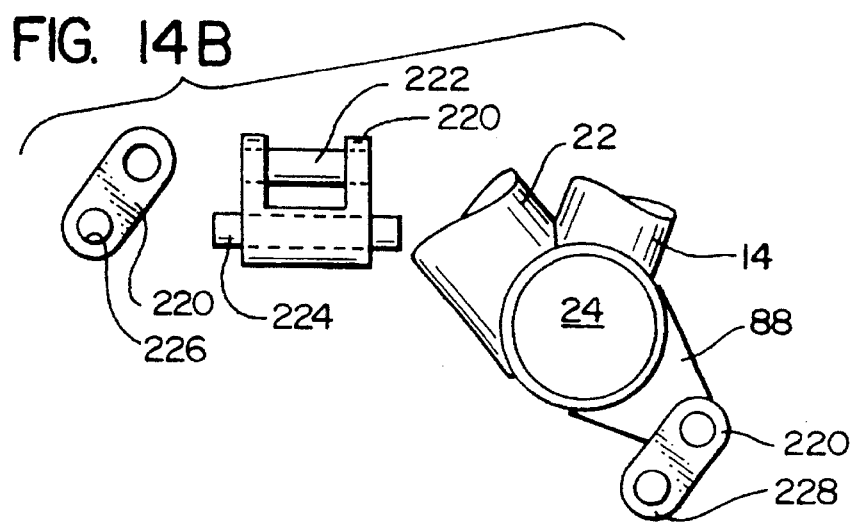

FIGS. 14A and 14B show first and second constructions for the eccentric crank members which are used in the suspension system which has been described above. Specifically, FIG. 14A shows a first form of crank member 210 in which there is a spindle portion 212 which passes through a cooperating bore formed in the rear frame lug 88. The lobe portions, in turn, are formed by end plates 214 which are pressed or keyed onto the outer ends of the spindle 212, with offset pin members 216a, 216b being mounted in the smaller, offset bores 218 of the end plates.

FIG. 14B, in turn, shows a form of eccentric crank in which there is a U-shaped yoke 220 (which may be, for example, a forged or cast member) which fits over the frame bracket 88 and is mounted thereto by a first pivot pin 222. The offset mount for attachment to the pivot assembly framework is provided by a second pivot pin 224 which is driven through a cooperating bore 226 formed in the depending end 228 of the yoke.

ii. Bottoms Pivot Arms

Figure 15A:
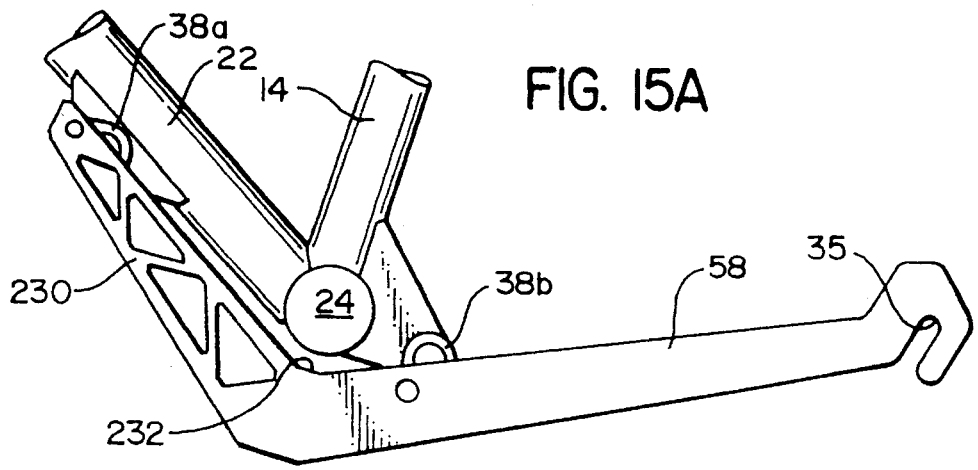
FIG. 15A–15B are elevational views of first and second embodiments of lower pivot assemblies in which the framework is provided by an extension arm which is mounted to the forward end of the wheel control arm.
Figure 15B:
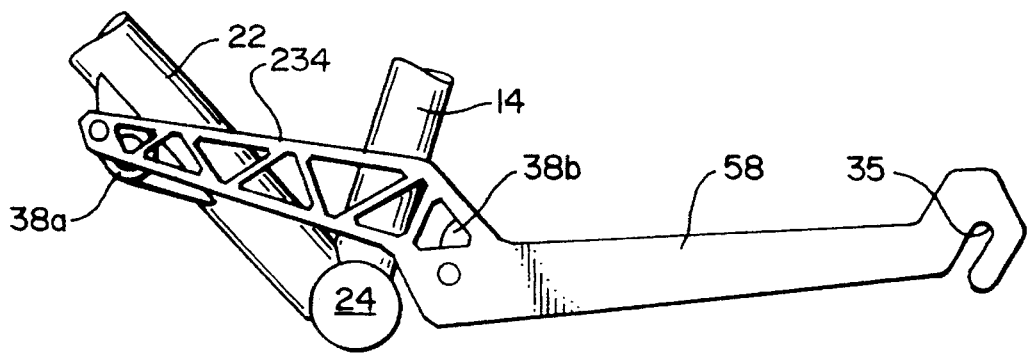

FIGS. 15A and 15B show embodiments in which the framework of the bottom pivot assembly, rather than surrounding the bottom bracket shell 24, passes either below or above this.

In particular, FIG. 15A shows an embodiment in which the forward end of the linear control arm 58 is mounted directly to the rear eccentric crank member 38b, and extends beyond this beneath the bottom bracket shell 24. An extension arm portion 230 extends upwardly and forwardly from the forward end of the control arm, and provides the mounting point for the forward eccentric crank member 38a. Sufficient clearance is provided at the inside junction 232 of the support arm and extension arm to clear the bottom bracket shell during operation of the assembly.

FIG. 15B shows a bottom pivot assembly which is essentially similar to that of FIG. 15A, except that an extension arm portion 234 is provided which passes above, rather than under, the bottom bracket shell 24.

iii. Eccentric Bearing Mechanism

Figure 16A:
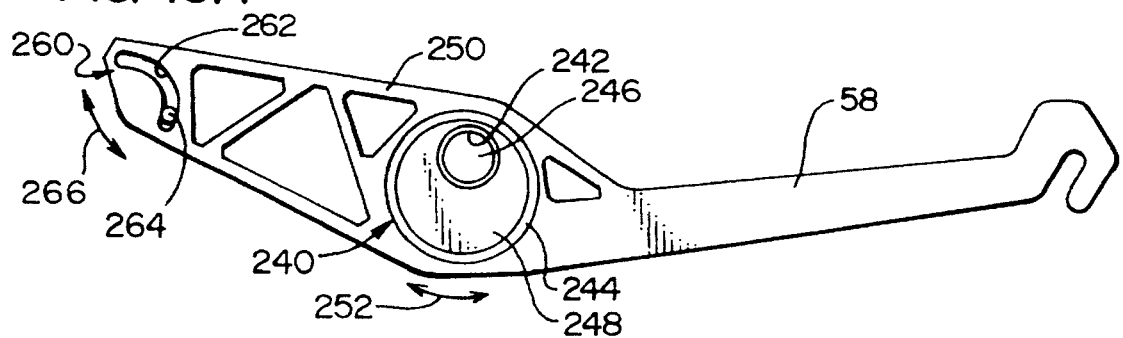
FIG. 16A is an elevational view of an embodiment of a lower pivot assembly in which an eccentric bearing assembly and frontal cam mechanism are used in place of the eccentric crank members shown in FIGS. 2–7B.
Figure 16B:
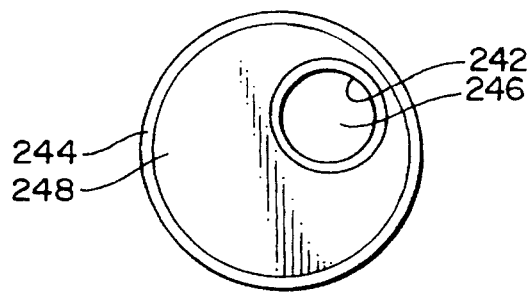
FIGS. 16B–16C are elevational and cross-sectional views of the eccentric bearing assembly of FIG. 16A.
Figure 16C:
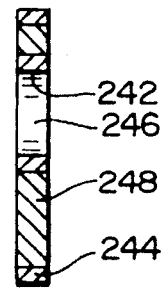

FIGS. 16A–C illustrate an embodiment of the present invention in which the rearward eccentric crank mechanism is replaced by an eccentric bearing assembly 240. The eccentric bearing assembly is provided with inner and outer offset bearing rings 242, 244, and an opening 246 which surrounds the bottom bracket shell/crankset of the bicycle.

As can be seen in FIGS. 16B–16C, the rotational axis of the inner bearing ring 242 is offset from that of the outer bearing ring 244. The inner and outer bearing rings may suitably be large-diameter rotating ball bearings, and are joined by a suitably shaped spacer disk or matrix 248. Inasmuch as the bearing structure permits the framework 250 of the lower pivot assembly to rotate on an eccentric path about the bottom bracket shell, as indicated by arrow 252, this assembly provides a motion which corresponds to that which is provided by the rear eccentric crank member in the embodiment of the system which has been described above.

A forward eccentric crank member such as those which have been described above can be used in conjunction with the eccentric bearing assembly 240. Alternatively, FIG. 16A shows a construction in which the eccentric crank member is replaced by a frontal cam mechanism 260. As can be seen, this comprises a cam surface in the form of a channel 262 which is cut in the forward end of the framework, and a cam follower in the form of a pin member 264 which is mounted to the forward frame section of the bicycle and extends outwardly from this into engagement with channel 262.

Thus, the rocking motion of the pivot assembly moves the pin member through the cam channel, imparting the cam motion indicated by arrow 266, which corresponds to that which is imparted by the forward eccentric crank member described above.

iv. Cam Slot and Follower Mechanism

FIGS. 17A–18B illustrate two configurations of lower pivot assembly in accordance with an embodiment of the present invention in which the correct wheel travel path is provided by a channel or slot or channel having a cam face, and a roller or pin which rides in this slot as the suspension is compressed so as to impart the desired S-shaped curvature to the wheel travel path.

Figure 17A:
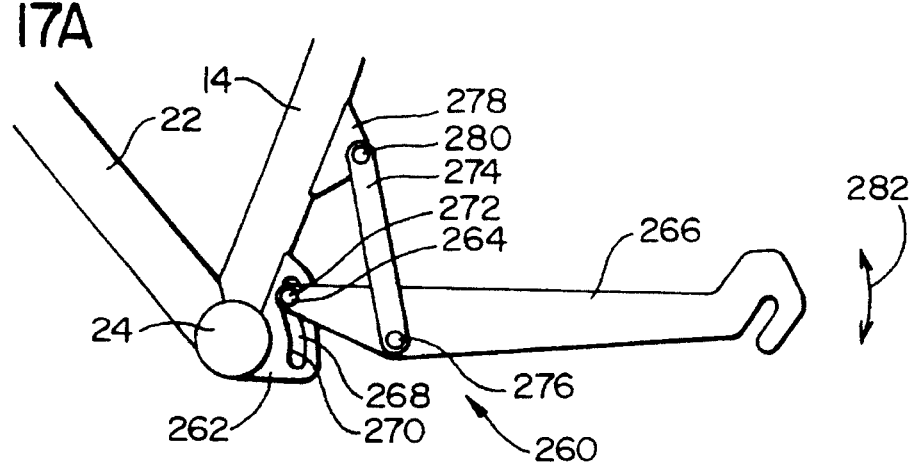
FIGS. 17A–17B are elevational views of first and second embodiments of a lower pivot assembly in accordance with the present invention in which the wheel travel path is effected by a cam face in a slot through which a follower pin travels as the suspension is compressed, the embodiment which is shown in FIG. 17A having the cam face mounted to the forward frame section, and the embodiment shown in FIG. 17B having the cam face formed on the forward end of the chainstay assembly.

In particular, in the construction which is shown in FIG. 17A, the pivot assembly 260 comprises a cam plate 262 which is mounted to and behind the bottom bracket shell 24 and seat tube 14, and a cam follower 264 which is mounted to the forward end of the lower swing arm member 266. The cam plate 262 is provided with a slot 266 having edges which form a cam face 270; the shape of the S-shaped cam face 270 corresponds to the S-shaped wheel travel path, but in an inverted orientation.

The cam follower 264, in turn, is formed by a transversely extending roller pin 272; this fits closely within the cam slot 268 in engagement with the cam surfaces thereof, so that the follower follows the path which is prescribed by the cam faces when the pin travels in a vertical direction through slot 268. Rearwardly of the cam follower but still towards its forward end, the lower swing arm member 266 is supported by a connecting arm 274 which is pivotally mounted to the swing arm member at its lower end (pivot pin 276), and to a frame bracket 278 on the seat tube at its upper end (pivot pin 280).

Accordingly, as the rearward end of the lower spring arm members is displaced vertically in the directions generally indicated by arrow 282, the roller pin 272 is driven vertically up and down through the slot 268 in the cam plate, so that the cam surface forces the rear axle to follow the desired wheel travel path.

Figure 17B:
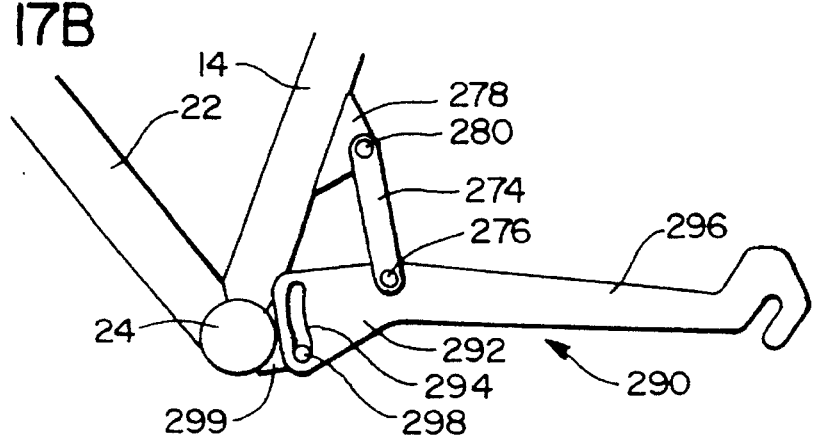

FIG. 17B shows a pivot assembly 290 which is generally similar to that which has been described with reference to FIG. 17A, with the exception that the cam plates 292 and cam slot 294 are formed on the forward end of the lower swing arm 296, while the cam follower pin 298 is fixedly mounted to frame bracket 299 on the bottom bracket shell. Accordingly, in this embodiment, the cam plate and slot move downwardly past the follower pin as the suspension is compressed, instead of vice-versa as in the embodiment which is illustrated in FIG. 17A.

Figure 18A:
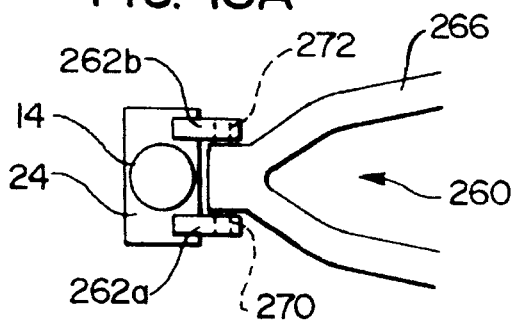
FIGS. 18A–18B are plan views of the cam slot/pin follower mechanism of the lower pivot assemblies which are shown in FIGS. 17A and 17B, respectively.
Figure 18B:
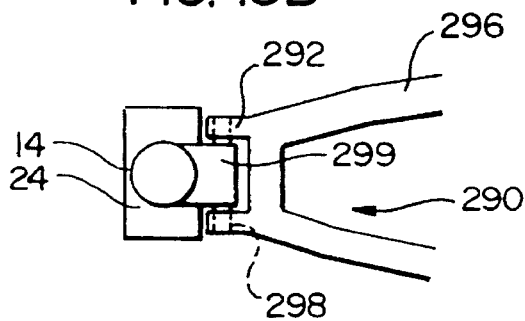

FIGS. 18A and 18B are top views of the cam plate/cam follower configurations of the two pivot assemblies 260, 290. As can be seen in FIG. 18A, the two cam plates 262a, 262b flank the forward end of the swing arm member 266, and the roller pin 262 extends transversely from this into the two cam slots. In FIG. 18B, in turn, the two cam plates 292 on the forward end of the swing arm flank the bracket 299 on which the follower 298 is mounted. The use of first and second cam plates has the advantage of increasing the cam surface area so as to reduce wear and increase longevity of the assembly, however, it will be understood that the arrangements which are illustrated in FIG. 18A and 18B can be "reversed" if desired, so that there is a single cam plate member which is flanked by first and second brackets supporting the follower pin.

v. Simplified Dual Eccentric Mechanism

Figure 19:
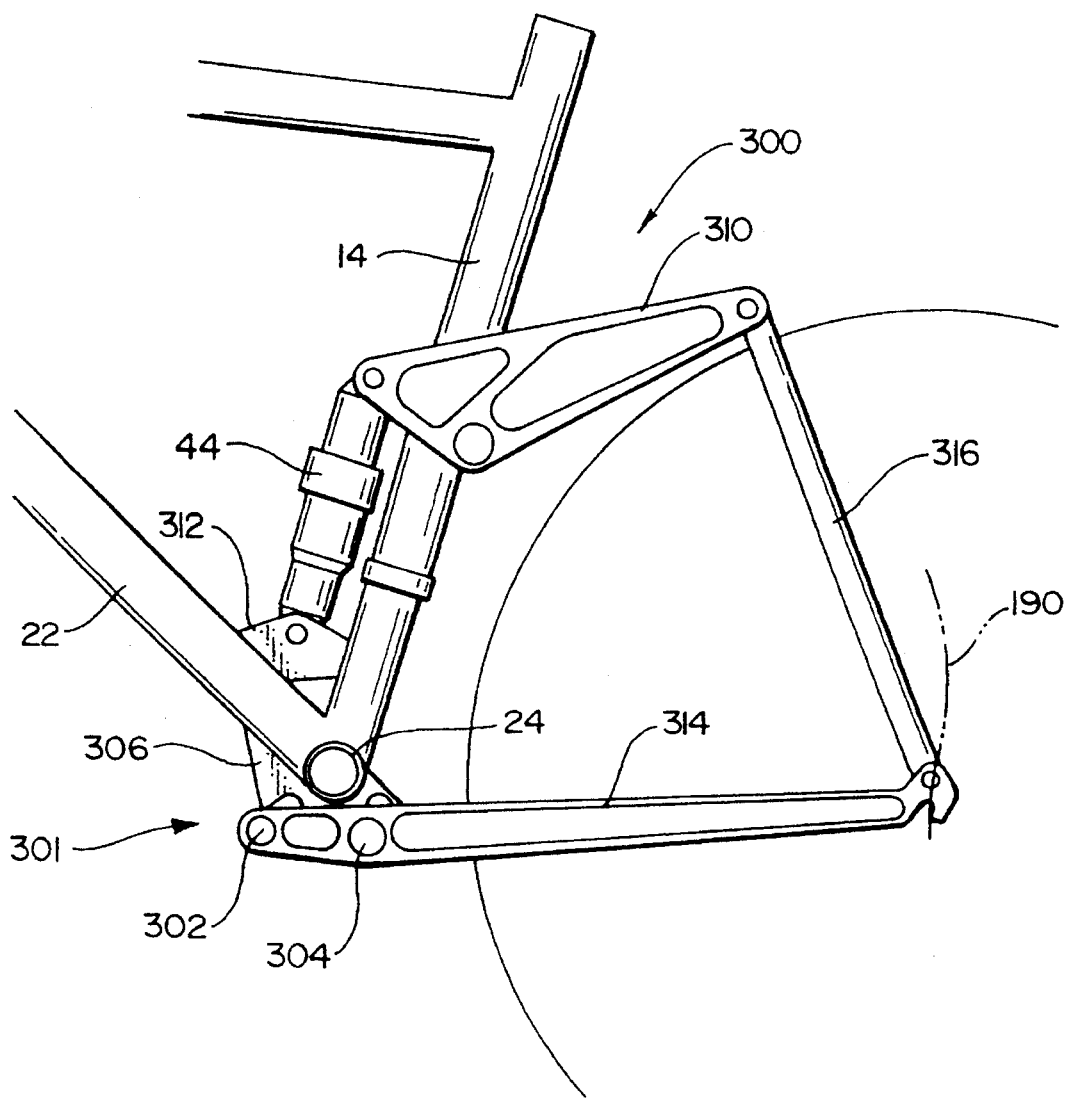
FIG. 19 is an elevational view of another embodiment of rear suspension assembly in accordance with the present invention which is similar to that which is shown in FIGS. 2–7B, but in which the eccentric crank members are both mounted below the bottom bracket shell of the frame and also closer together, which construction enhances the strength and economy of the assembly.

FIG. 19 shows a rear suspension assembly 300 in accordance with an embodiment of the present invention which is similar to that which has been described above with respect to FIGS. 2–10, but in which the assembly, and the eccentric crank mechanism in particular, have been simplified. This provides the advantages which will be discussed below.

In the suspension assembly 300, both of the eccentric crank members 302, 304 are positioned below the bottom bracket shell 24, on a downwardly extending frame bracket 306. The rocker arm or top link member 310, in turn, is formed as a unitary member, e.g., as a single piece of cast magnesium or aluminum alloy. As with the similar embodiment described above, the forward end of the rocker arm member is pivotally mounted to the upper end of a spring/damper assembly 44; in this embodiment, however, the fulcrum point of the top-link has been moved down the seat tube so as to allow the lower end of the spring/damper assembly to be pivotally mounted to a simplified frame bracket 312 which bridges the lower ends of the seat and down tubes 14, 22. This also allows for easier adaptation to smaller bike-frame sizes.

The lower swing arm member 314, and the upper swing arm member 16 are generally similar to the corresponding elements which have been described above, although (as will also be discussed below), the forgings/castings have been simplified for economy of manufacture and increased strength.

The partially disassembled view of FIG. 20 illustrates the combined pivoting motion of the dual eccentric crank members 302, 304, which provides the desired wheel travel path, which is essentially identical to that which has been described above. FIG. 20 also shows the somewhat bifurcated construction of the downwardly extending frame bracket 306 having forwardly and rearwardly extending portions which support the two crank members.

Figure 21A:
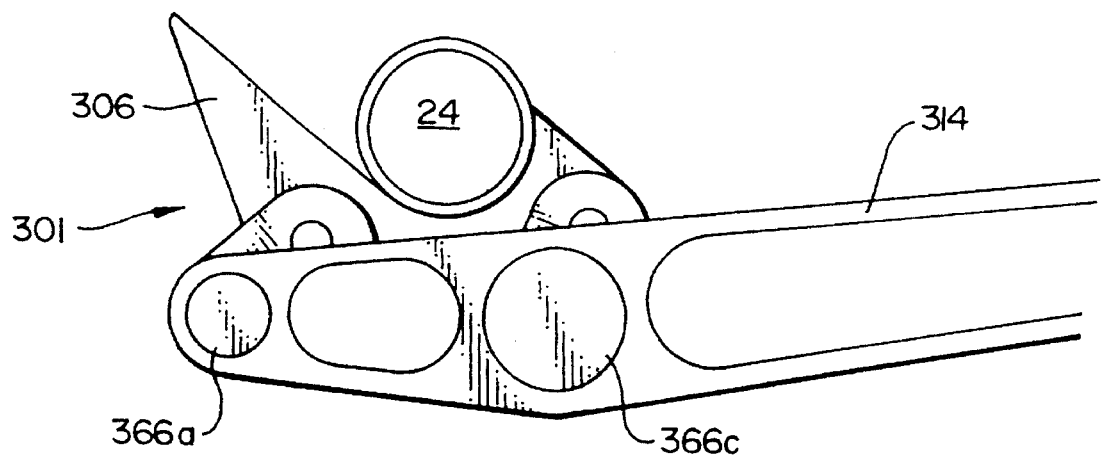
FIG. 21A is an elevational view of the dual eccentric crank mechanism of the assembly which is shown in FIG. 19, showing this adjacent the bottom bracket shell of the bicycle frame.
Figure 21B:
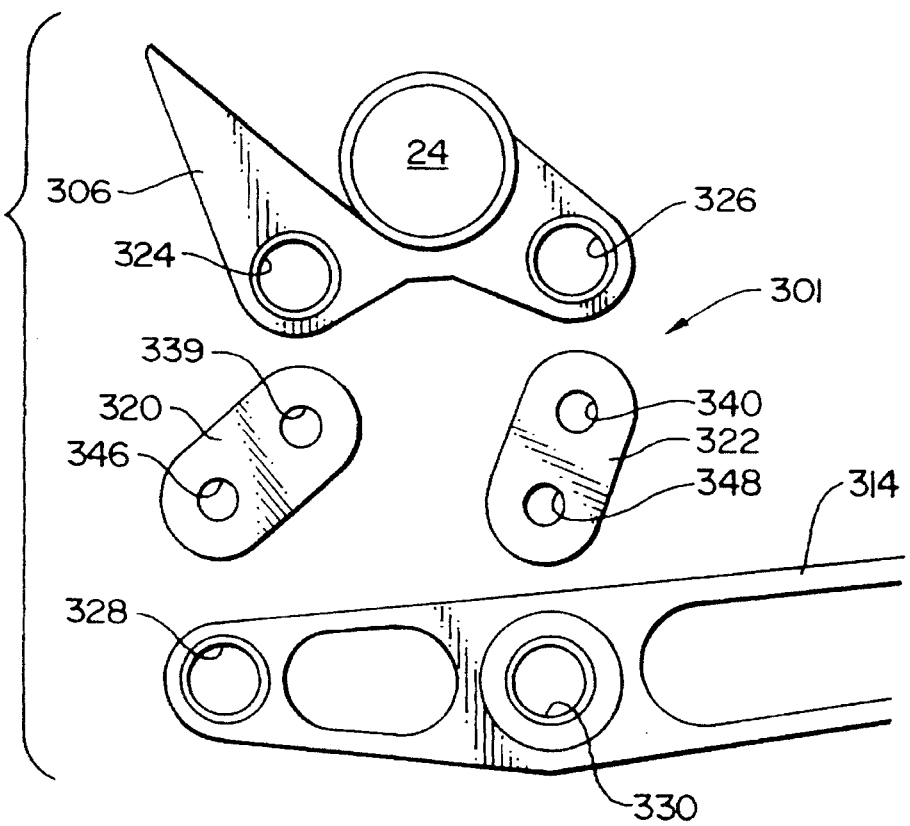
FIG. 21B is an elevational, partially-exploded view of the eccentric crank mechanism of FIG. 21A.

The dual eccentric crank linkage 301 is shown in enlarged detail in FIGS. 21A–21B. As can be seen, a forward and rearward eccentric crank members 302, 304 each comprise a pivoting link member 320, 322, having upper ends which are supported for pivoting movement in the frame bracket 306 by bearings 324, 326, and lower ends which are supported for pivoting movement on the forward end of the lower swing arm member 314 by bearings 328, 330.

Figure 22:
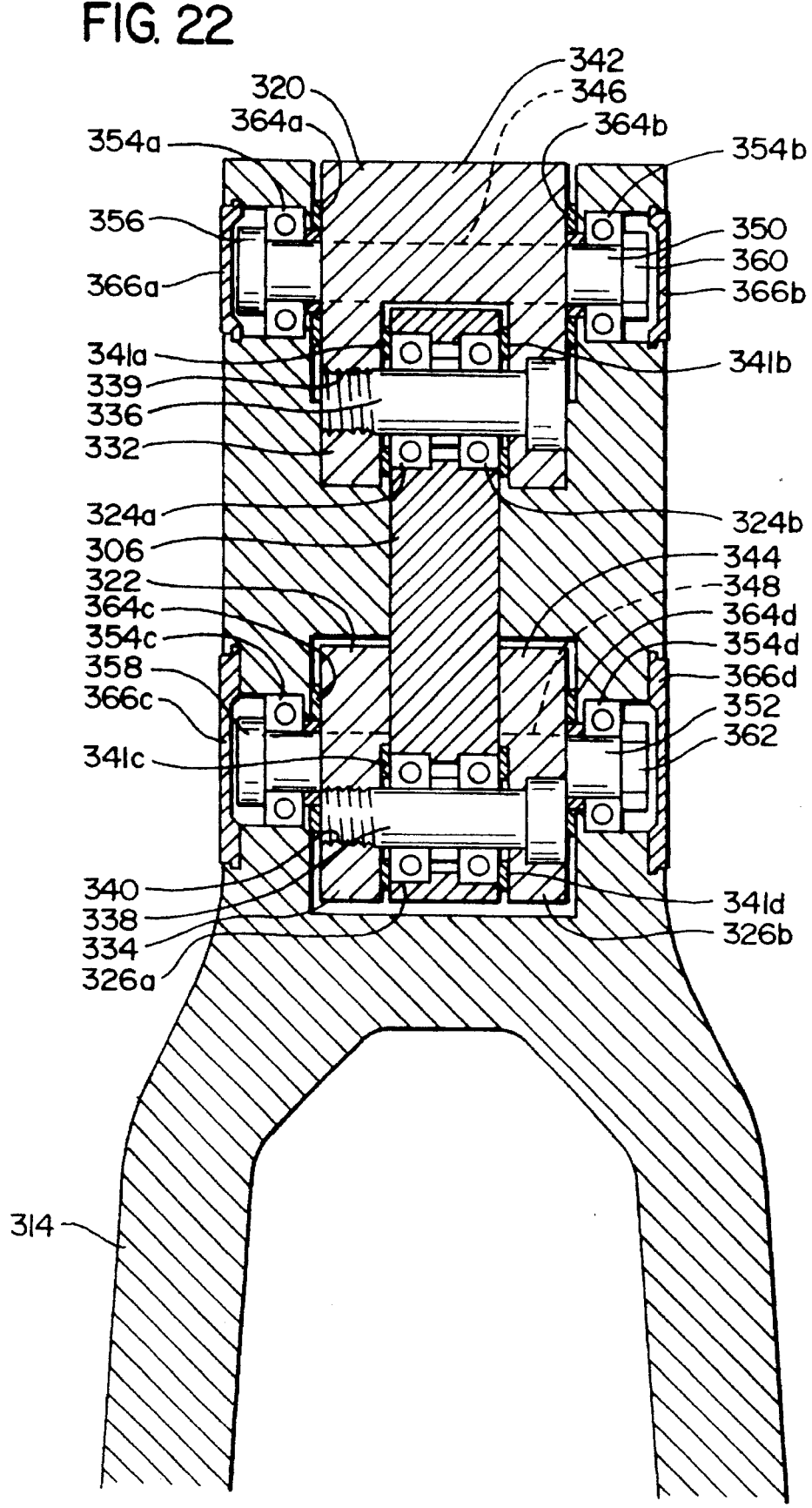
FIG. 22 is a top view of a cross-section taken horizontally through the eccentric crank mechanism of FIGS. 19–21B.
Figure 23:
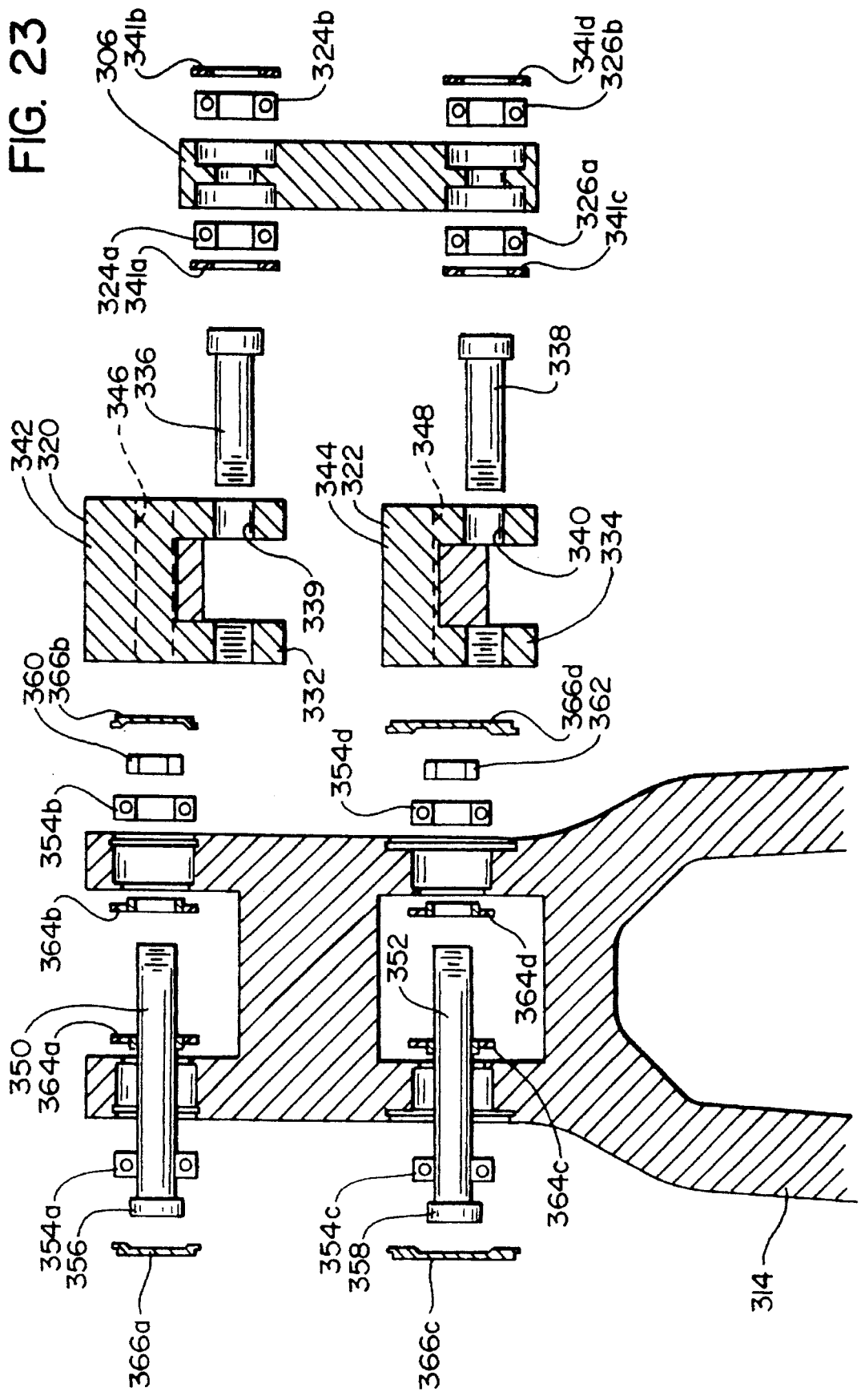
FIG. 23 is an exploded view of the assembly which is shown in FIG. 22.

As is shown in cross-sectional view of FIG. 22, the upper ends 332, 334 of the crank links 320, 322 are bifurcated so as to form a slot for receiving the lower edge of frame bracket 306. Pivot pins 336, 338 are threadedly mounted in bores 339, 340 in the upper ends of the links, and extend through the corresponding bores of bearings 324a,b and 326a,b which are located in recesses formed in the sides of the frame bracket 306. Thrust washers 341a–d are sandwiched between the outer surfaces of the bearings 324, 326 and the inner surfaces of the pivoting links 320, 322.

The lower, solid (i.e., non-bifurcated) ends 342, 344 of the crank links, in turn, are pierced by smooth bores 346, 348 which provide support for the middle portions of the lower pivot pins 350, 352. The outer ends of the two lower pivot pins are supported in the relatively straight forward end of the lower swing arm member by bearings 354a–d which are retained in corresponding recesses formed in the member. The pivot pins are provided by hardened bolts, with bolt heads 356, 358 on one end and lock nuts 360, 362 on the other which engage the outer surfaces of the bearings 354a–d so as to provide a predetermined amount of preload. The inner surfaces of the bearings, in turn, engage thrust washers 364*a–d* which abut the outer surfaces of the two pivoting links 320, 322. To exclude dirt and water from the bearings, the recesses in the swing arm member are covered by removable dust caps 366*a–d*.

In this embodiment, the eccentrics are positioned closer together on the frame than in that which has been described above. As a result, the difference between the angles of the eccentrics must be significantly less; for example, in the specific embodiment which is illustrated, in which the spacing between the axes of the two eccentrics is approximately 2.5 inches, the initial angle between them may be only about 30°, e.g., 135° and 160° forward of TDC, respectively.

As was noted above, the suspension assembly 300 which is shown in FIGS. 19–23 provides essentially the same, controlled wheel path as that which has been described with regard to FIGS. 2–11. The relative advantages which are provided by the simplified design lie primarily in its cost, strength, simplified production, and serviceability. For example, the simplified embodiment uses fewer parts and requires less welding. Furthermore, by moving the dual eccentrics closer together and positioning them underneath the bottom bracket shell, it is no longer necessary to construct the chainstay (i.e., the lower swing arm member) assembly out of several pieces, but instead both this and the linkage attachments (as well as the pivoting top-link) can be cast as single piece. Also, the reduction in the number of brackets used reduces the amount of welding and bolting which is required.

The embodiment which is illustrated in FIGS. 19–23 also provides the advantage of relatively increased lateral stability. Firstly, the one-piece, shear-stress reinforced design of the top link 310 will resist twisting forces applied to the rear wheel. Also, resistance to lateral movement is increased by the design of the chainstay/lower swing arm member 314. Firstly, the one-piece double cross-braced design is inherently stiff; secondly, by moving the dual eccentrics closer together, the front eccentric is able to provide a relatively greater percentage of the stability of the entire pivot mechanism.

The suspension mechanism 300 is also relatively less sensitive to bearing and bushing tolerances, inasmuch as the primary force on the bearings in this embodiment is linear rather than radial. The thrust washer bushings can be interference fit between the eccentrics, mounting bracket, and chainstay assembly to avoid play. Also, while the embodiment which is illustrated uses bolts to provide the necessary preload on the eccentric shafts, it is possible to machine the desired preload for the thrust washers into the parts themselves, thus eliminating the need for bolts and allowing for the use of simple and inexpensive shafts and spring clips.

As yet another advantage, the suspension assembly 300 which is illustrated in FIGS. 19–23 enjoys significantly enhanced long-term durability. In particular, by distributing the forces of the chainstay member "in parallel" between two sets of pivots (as opposed to "in series" as in a four-bar-linkage or Horst-link design), the noticeable effects of long-term wear are greatly reduced. Moreover, the nominal bearings and inexpensive bushings can easily be replaced if significant wear does occur.

It is clear from the foregoing that the present invention provides a unique, S-shaped wheel travel path having a lower curved portion in which there is an increasing rate of chainstay lengthening as the suspension compresses toward the preferred pedaling position, and a second curved portion above the preferred pedaling position in which there is a decreasing rate of chainstay lengthening, which yields the advantages which have been discussed above. The inventors have disclosed several embodiments of the present invention in which various mechanisms which are employed to generate the controlled wheel travel path; it will be understood that numerous modifications to and variations on these mechanisms will occur to those having ordinary skill in the art, and it should be understood that such will fall within the scope of the present invention. Moreover, in the illustrative embodiments which have been described herein, generation of the S-shaped wheel path is principally a function of the lower pivot assembly; as a result, it will be understood that these and other lower pivot mechanisms which provide the S-shaped path may be used in combination with other types of suitable upper suspension mechanisms, in addition to the rocker-arm top-link mechanism which has been shown herein.

It is therefore to be recognized that these and many other modifications may be made to the illustrative embodiments of the present invention which are shown and discussed in this disclosure without departing from the spirit and scope of the invention. As just one example, in some embodiments the bearings of the pivot assemblies may be mounted to the eccentrics themselves, rather than to the supporting members. Accordingly, the present invention is not to be limited except as by the appended claims.

What is claimed is:

1. A bicycle, comprising:

a forward frame section having a crankset mounted thereto; and a compressible rear suspension section, said rear suspension section comprising:

means for mounting a rear wheel axle rearwardly of said crankset, said crankset and said axle being interconnected by a drive chain to which drive tension is applied by said crankset; and means for moving said rear wheel in a generally upward direction along generally S-shaped path as said rear suspension section compresses in response to an external force which is received by said suspension section, said generally S-shaped path comprising:

a curved lower portion which is at least partially convex on a forward side toward said crankset;

a curved upper position which is at least partially concave on said forward side; and a predetermined pedalling position located proximate an inflexion zone at which said path transitions from said lower curved portion to said upper curved portion, so that there is an increasing rate of chainstay lengthening as said axle moves along said path toward said predetermined pedalling position, and so that there is a decreasing rate of chainstay lengthening as said axle moves upwardly along said path above said predetermined pedalling position;

said means for moving said rear wheel along said predetermined path comprising:

a control arm member having a rearward end to which said wheel is mounted and a forward end; and a pivot assembly mounted to said forward end of said control arm member, said pivot assembly comprising:

cam means having a first portion mounted to said pivot assembly and a second portion mounted to said forward frame section, said cam means being configured to direct said rear wheel along said S-shaped path in response to compression of said suspension section.

2. The bicycle of claim 1, wherein said cam means comprises:
   a forward eccentric cam member pivotally mounted to said forward frame section forwardly of said crankset;
   a rear eccentric cam member pivotally mounted to said forward frame section rearwardly of said crankset; and
   a framework mounted to said forward end of said control arm member and being interconnected with said forward frame section by said eccentric cam members;
   said forward and rearward eccentric crank members being configured to move said rear wheel along said S-shaped path in response to compression of said suspension section.

3. The bicycle of claim 2, wherein said eccentric cam members each comprise:
   a spindle portion which is mounted in said forward frame section for rotation about a first axis; and
   a lobe portion which extends at an angle from said spindle portion and defines a second axis of rotation which is offset from and extends parallel to said first axis.

4. The bicycle of claim 3, wherein said lobe portions of said eccentric cam members are received for rotation in said framework of said pivot assembly.

5. The bicycle of claim 4, wherein said eccentric cam members are configured so as to impart a motion to said framework of said pivot assembly in a downward and rearward direction as said suspension is compressed.

6. The bicycle of claim 4, wherein said framework of said pivot assembly is configured so that when said suspension section is in an uncompressed condition, said angle at which said lobe portion of said forward eccentric cam member extends from said spindle portion thereof is a relatively lesser angle forward of top-dead-center, and said angle at which said lobe portion of said second eccentric cam means extends from said spindle portion thereof is a relatively greater angle forward of top-dead-center, so that said motion which is imparted to said framework is developed in sequential phases which correspond to said lower and upper portions of said wheel path, said phases of motion comprising:
   a first phase in which said angles at which said lobe portions extend are generally more parallel to one another, so that said rear wheel pivots about a point which is above said crankset and there is a relatively greater rate of chainstay lengthening; and
   a second phase in which said angles at which said lobe portions extend rotate from being generally more parallel to one another to being at generally greater angles to one another, so that said rear wheel pivots about a point which is proximate said forward eccentric crank member and there is a predetermined decrease in said rate of chainstay lengthening.

7. The bicycle of claim 6, wherein said spindle portions of said first and second cam means are spaced apart by approximately 7 inches, and said relatively lesser angle is approximately 45° forward of top-dead-center and said relatively greater angle is approximately 135° forward of top-dead-center.

8. The bicycle of claim 6, wherein said spindle portions of said first and second cam means are spaced apart by approximately 2.5 incheas, and relatively lesser angle is approximately 135° forward of top-dead-center and said relatively greater angle is approximately 160° forward of top-dead-center.

9. The bicycle of claim 1, wherein said frame section further comprises:
   an upper control arm having a lower end pivotally mounted to a rearward end of said lower control arm;
   a rocker member having a rearward end pivotally mounted to an upper end of said upper control arm and a middle portion pivotally mounted to said forward frame section; and
   a spring member mounted pivotally mounted to a forward end of said rocker member and to said forward frame section of said bicycle, so that said spring member is compressed between said forward end of said rocker member and said forward frame section as said suspension section is compressed so that said rearward end of said upper control arm is displaced in an upward direction.

10. The bicycle of claim 9, wherein said spring member comprises a hydraulic shock absorber.

11. The bicycle of claim 1, wherein said S-shaped path which is followed by said wheel is a continuous compound curve comprising:
    a curved lower portion having a first averaged radius and a focus on the rearward side of said compound curve; and
    a curved upper portion having a second averaged radius and a focus on a forward side of said compound curve.

12. The bicycle of claim 11, wherein said averaged radius of said lower curved portion of said compound curve is sized sufficiently large that said lower curved portion approximates a substantially straight line extending in a generally vertical, slightly rearward direction.

13. The bicycle of claim 1, wherein said cam means interconnecting said forward frame section and said pivot assembly of said suspension section comprises:
    a forward cam member positioned in front of said crankset; and
    an eccentric bearing assembly comprising:
      an inner bearing ring mounted concentrically around a bottom bracket shell which retains said crankset, so as to permit said eccentric bearing to rotate about said bottom bracket shell;
      an outer bearing ring rotatably mounted to said framework so that said inner bearing ring is positioned off-center within said outer bearing ring, so that said eccentric bearing assembly defines first and second off-set axes of rotation; and
      spacer means for interconnecting said inner and outer bearing rings.

14. The bicycle of claim 1, wherein said forward cam member comprises:
    a cam portion mounted to said framework of said pivot assembly; and
    a cam follower mounted to said forward frame section.

15. The bicycle of claim 14, wherein said cam portion comprises a channel portion formed in a forward portion of said framework of said pivot assembly, and said cam follower comprises a pin member which extends from said frame section so as to engage said channel portion.

16. A bicycle, comprising:
    a forward frame section having a crankset mounted thereto; and
    a compressible rear suspension section, said rear suspension section comprising:
      means for mounting a rear wheel axle rearwardly of said crankset, said crankset and said axle being interconnected by a drive chain to which drive tension is applied by said crankset; and means for moving said rear wheel in a generally upward direction along a generally S-shaped path as said rear suspension section compresses in response to an external force which is received by said suspension section, said generally S-shaped path comprising a curved lower portion which is at least partially convex on a forward side toward said crankset and a curved upper position which is at least partially concave on said forward side.

17. The bicycle of claim 16, wherein said S-shaped path further comprises:

a predetermined pedalling position located proximate an inflexion zone at which said path transitions from said lower curved portion to said upper curved portion, so that there is an increasing rate of chainstay lengthening as said axle moves along said path toward said predetermined pedalling position, and so that there is a decreasing rate of chainstay lengthening as said axle moves upwardly along said path above said predetermined pedalling position.

18. The bicycle of claim 17, wherein said means for moving said rear wheel along said predetermined path comprises:

a control arm member having a rearward end to which said wheel is mounted and a forward end; and a pivot assembly mounted to said forward end of said control arm member, said pivot assembly comprising:

cam means having a first portion mounted to said pivot assembly and a second portion mounted to said forward frame section, said cam means being configured to direct said rear wheel axle along said S-shaped path in response to compression of said suspension section.

19. The bicycle of claim 18, wherein said cam means comprises:

a forward eccentric cam member pivotally mounted to said forward frame section forwardly of said crankset;

a rear eccentric cam member pivotally mounted to said forward frame section rearwardly of said crankset; and a framework mounted to said forward end of said control arm member and being interconnected with said forward frame section by said eccentric cam members;

said forward and rearward eccentric crank members being configured to move said rear wheel along said S-shaped path in response to compression of said suspension section.

20. The bicycle of claim 18, wherein said frame section further comprises:

an upper control arm having a lower end pivotally mounted to a rearward end of said lower control arm;

a rocker member having a rearward end pivotally mounted to an upper end of said upper control arm and a middle portion pivotally mounted to said forward frame section; and a spring member mounted pivotally mounted to a forward end of said rocker member and to said forward frame section of said bicycle, so that said spring member is compressed between said forward end of said rocker member and said forward frame section as said suspension section is compressed so that said rearward end of said upper control arm is displaced in an upward direction.

21. The bicycle of claim 18, wherein said S-shaped path which is followed by said rear wheel axle is a continuous compound curve comprising:

a curved lower portion having a first averaged radius and a focus on the rearward side of said compound curve; and a curved upper portion having a second averaged radius and a focus on a forward side of said compound curve.

22. The bicycle of claim 21, wherein said averaged radius of said lower curved portion of said compound curve is sized sufficiently large that said lower curved portion approximates a substantially straight line extending in a generally vertical direction.

* * * * *